March 26, 1968 R. A. GLEIM ET AL 3,375,507

INFORMATION ADDRESS RECORDING AND RETRIEVAL SYSTEM

Filed March 13, 1967 8 Sheets-Sheet 1

INVENTORS.
RALPH A. GLEIM
ERWIN A. HAUCK
RICHARD C. SIMONSEN

BY Christie, Parker & Hale
ATTORNEYS.

INVENTORS.
RALPH A. GLEIM
ERWIN A. HAUCK
RICHARD C. SIMONSEN
BY Christie, Parker & Hale
ATTORNEYS.

INVENTORS.
RALPH A. GLEIM
ERWIN A. HAUCK
RICHARD C. SIMONSEN
BY Christie, Parker & Hale
ATTORNEYS.

INVENTORS
RALPH A. GLEIM
ERWIN A. HAUCK
RICHARD C. SIMONSEN
BY Christie Parker & Hale
ATTORNEYS.

INVENTORS
RALPH A. GLEIM
ERWIN A. HAUCK
RICHARD C. SIMONSEN
BY Christie, Parker & Hale
ATTORNEYS.

INFORMATION ADDRESS RECORDING AND RETRIEVAL SYSTEM

March 26, 1968 R. A. GLEIM ET AL 3,375,507

INFORMATION ADDRESS RECORDING AND RETRIEVAL SYSTEM

Filed March 13, 1967 8 Sheets-Sheet 7

INVENTORS.
RALPH A. GLEIM
ERWIN A. HAUCK
RICHARD C. SIMONSEN
BY Christie, Parker & Hale
ATTORNEYS.

INVENTORS.
RALPH A. GLEIM
ERWIN A. HAUCK
RICHARD C. SIMONSEN
BY Christie, Parker & Hale
ATTORNEYS.

United States Patent Office 3,375,507
Patented Mar. 26, 1968

3,375,507
INFORMATION ADDRESS RECORDING AND RETRIEVAL SYSTEM

Ralph A. Gleim, Pasadena, Erwin A. Hauck, Arcadia, and Richard C. Simonsen, South Pasadena, Calif., assignors to Burroughs Corporation, Detroit, Mich., a corporation of Michigan Continuation-in-part of application Ser. No. 306,365, Sept. 3, 1963. This application Mar. 13, 1967, Ser. No. 649,752
40 Claims. (Cl. 340—174.1)

ABSTRACT OF THE DISCLOSURE

A method for recording and retrieving data from a storage means which may conveniently be a disk of a disk file computer is disclosed which comprises the steps of assigning one portion of the storage means as an information portion, in which sector of words are to be written or read. A separate clock portion of the storage means is utilized to record signals in one track which mark the location of all of the words in a sector. Further recorded in the same track with the word mark signals is an absolute address signal which follows the word mark signal immediately preceding the word mark signal of the first word of the record identified by the absolute address signal. Also disclosed is a memory storage means which is formated by the described method. In conjunction with the memory disk is an information storage and retrieval system which comprises means for addressing the memory with the absolute address of a record to be located; means for recovering from the clock portion the absolute address of the addressed record together with means for recovering the word mark signals following the absolute address. When the addressed address and the recovered address are the same, a priming condition is applied to an information gate which is connected to a read-write head located at the information portion of the memory disk. When interlaced words of information are stored in the sectors of a memory disk in accordance with this invention, the gate is maintained in a primed condition and responds to the next word mark recovered from the clock portion of the memory disk by transferring the first information word relative to the memory disk. Means are disclosed for opening and closing the continually primed gate once for every other information word of the interlaced sector. Means are also disclosed for reading absolute addresses during the word intervals in which information is not being transferred relative to the memory disk.

Also disclosed is a method of recording and retrieving data from a storage means such as a memory disk in which the same clock and information portions are assigned and wherein the information words of one record successively follow each other in an information sector. Recorded in one track of a clock portion of the memory disk are marking signals which mark in advance the location of the first information word in each record, each marking signal is followed by an absolute address signal in the same track with the marking signal which absolute address signal identifies the next upcoming record. The end of the address signal is synchronized with the end of the record immediately preceding the next upcoming record which is the record identified by the address. A memory disk having a format in accordance with the described method for successive word sectors is disclosed together with an associated information recording and retrieval information system in which means are disclosed for receiving an address of a record to be located in the disk, comparing the sought after address with the recovered addresses, and applying a priming signal to an information gate connected to a read-write head when both addresses are the same. Sensing means are associated with the address recovery means for sensing the end of the absolute address signal and in response thereto enable the previously primed gate to transfer the first and all subsequent words of the located record relative to the memory disk.

Information of the record to be translated relative to the memory disk is monitored by a second sensing means which is operative in response to the next marking signal in the clock portion and to the end of the record to be translated relative to the information portion for stopping information transfer and for returning the information system to an address searching mode of operation.

The present invention relates broadly to information recording and retrieval systems and, more particularly, to a new and improved method and circuit for recording absolute addresses in a memory store, and means for recovering the recorded addresses within a limited access time.

CROSS REFERENCES TO RELATED APPLICATIONS

This application is a continuation-in-part of patent application Ser. No. 306,365, filed Sept. 3, 1963, allowed on Dec. 6, 1966, now abandoned, and continued in full herein.

BACKGROUND OF THE INIVENTION

(1) *Field of the invention*

This invention finds application in the field of information storage and retrieval equipment and, more particularly, finds application in the field of equipment arranged for digital information which is to be stored on and recovered from magnetic memory stores. In one particular nonlimiting embodiment of this invention, the magnetic memory store is a disk file computer system.

(2) *Description of the prior art*

In memory stores such as drums or disk files, information in the form of magnetically recorded impulses are stored on the drum or disk surfaces which are coated with a film of magnetic material. Each impulse so stored is termed a "bit" of information, and many of these bits are continuously recorded in information tracks. Any store will have numerous tracks of information, each having assigned to it a head for reading back the information on command. Such information, to be useful when read back, must be grouped into characters, or a predetermined number of information bits. Such characters must further be grouped into words; and finally, a predetermined number of words must be grouped into records. These various groupings have been done in the past by recording timing signals in numerous control or clock tracks, on the memory store. Signals in these clock tracks signify the location of the various bits in an information track, and mark the beginning and end of characters, words, and records. Each of the aforementioned signals requires its own clock track, each of which has associated therewith a reading head, peak detecting and amplifying circuits, and gating devices. This practice results, therefore, in an expensive system with considerable duplication of components and circuitry in order to correctly identify what portion of the recorded information is being read at any particular instant. Furthermore, this practice results in extreme difficulty in synchronizing the signals in all of these various clock tracks.

The above-mentioned prior art systems, even with their numerous clock tracks, still faced the problem that each information track has stored therein many records; and when the reading head for any track is turned on, it is essential to choose the particular record desired from among these many records. Accounting schemes have been employed in the past in which a dead space, or absence of information, which is provided on most memory stores, is employed to mark a beginning spot for the retrieving circuitry. During this dead space, all circuitry is reset and synchronized. One portion of the retrieval circuitry has stored therein the number of addresses which must be counted after the dead space appears prior to the reading head reaching the desired record.

This approach requires considerable access time. In many instances, the desired record will be physically located on the store between the spot at which the reading head is turned on and the dead space. When this is the case, the record desired is passed, and all circuitry must await one complete revolution prior to obtaining a reading of the desired record.

SUMMARY OF THE INVENTION

This invention overcomes the above disadvantages by a new and novel method and circuit for combining all timing signals required for retrieving a desired information record into two distinct clock tracks. Thus, the number of clock tracks and associated components and circuitry required for reading the clock tracks is greatly from prior art systems. Further, with only two clock tracks in accordance with the requirements of this invention present on a memory store, the problems involved in synchronizing the timing signals with each other are markedly reduced. In addition, this invention employs an absolute address recovering scheme which provides the identification of each record prior to its appearance, and circuitry is provided which automatically responds to the absolute address for initiating control sequences which assure that the record is read the first time it appears. This approach reduces the access time for desired records, which reduction is of utmost importance in today's high speed computer systems.

In accordance with one embodiment of this invention, an information recording circuit is provided with a writing head for recording on an information track, or group of information tracks, of a memory store, two distinct records, N and $N+X$, where X is any other record. The words of each record are interlaced in a numerical order such that the first word of record $N+X$ follows the first word of record N, the second word of record $N+X$ follows the second word of record N, etc., until the last word of record $N+X$ follows the last word of record N. Circuitry is also provided for recording on the store one clock track of continuous signals marking the location of each bit of stored information; and for recording on a second clock track which is assigned to and distinct from the above-mentioned tracks. This second clock track contains word mark signals which identify the beginning of each word in each record, and further contains address identifying signals which precede the word mark of the first word in every record. These address signals represent the identity of the next upcoming record, and thus are absolute rather than relative as in prior art.

Also, in accordance with this invention, an address retrieval circuit is provided which includes a storage device for storing input signals representative of the identity of a sought-after record. Reading heads which are positioned on a memory store recover signals from the store's information and clock tracks and are connected by gates to a second signal storage device. These gates are normally set in a state which causes upcoming record address identifying signals to be stored in this second signal storage device. A comparison circuit monitors the addresses in the first and second storage devices, and emits a signal indicative of a true comparison to a gate control circuit which in turn is activated only upon occurrence of the next following word mark signal, and each word mark signal thereafter which introduces the words of the desired record. Activation of this gate control circuit conditions the gates connected between the reading heads and the second storage device to recover the interlaced information words of the desired record.

BRIEF DESCRIPTION OF THE DRAWINGS

The invention is described in more detail by reference to the accompanying drawings in which:

Referring now to FIG. 1, a block diagram of an information recording system is shown in which a memory device 20 is continually rotating beneath write heads 21A and, 21B connected to an amplifier circuit 22 through switch 31B. The memory device 20 is shown as a disk file, but it should be understood that any memory store could be employed.

Figure 1:
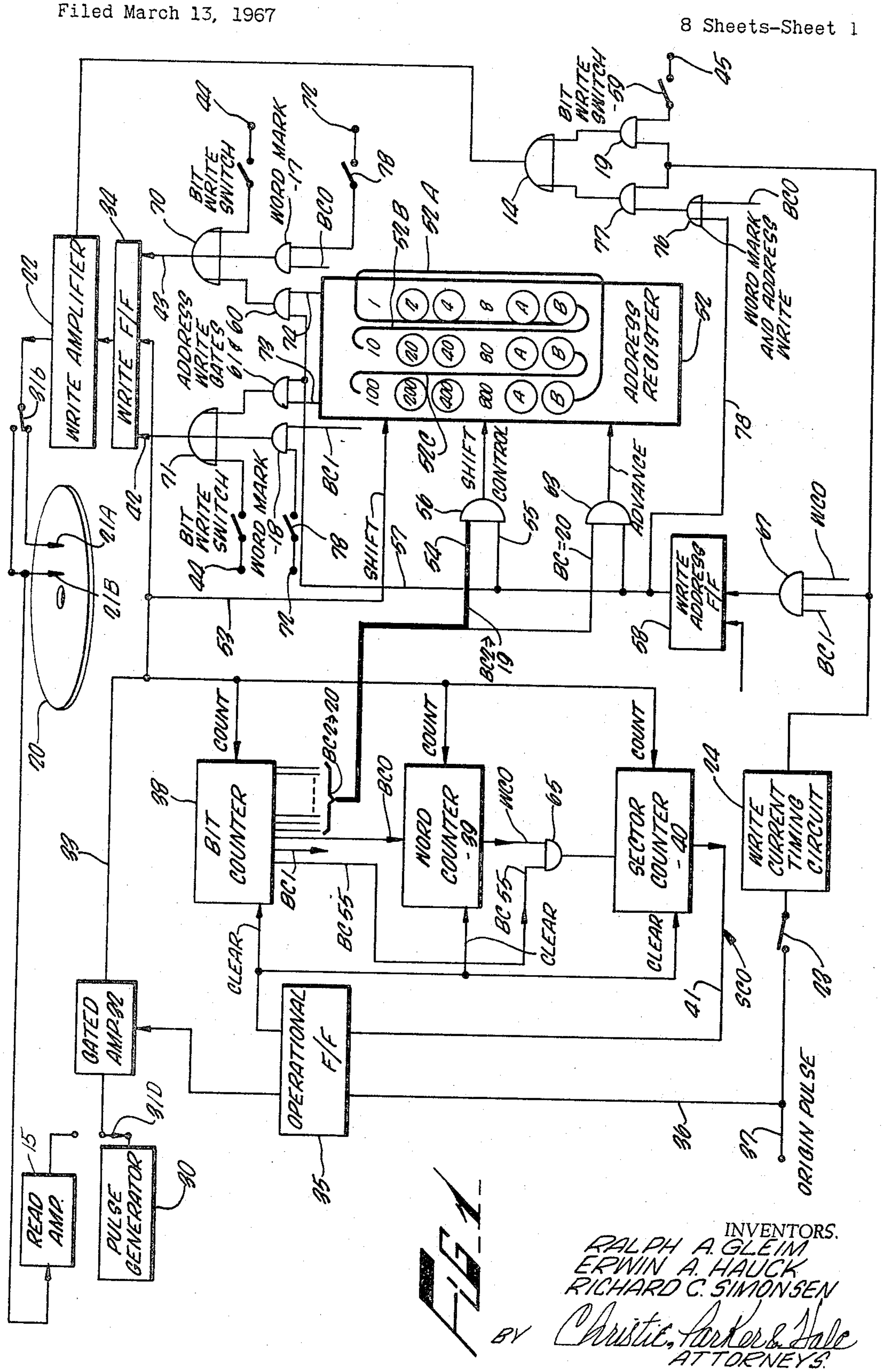
FIG. 1 is a block diagram of an information recording circuit embodying the principles of the present invention.

Prior to discussing the operation of the circuit of FIG. 1 concerning the manner of recording information on the disk file, it is essential to point out the manner in which information words and the clock tracks which designate these words are formed. The information may be gained by reference to FIG. 2 and FIG. 3.

Figure 2:
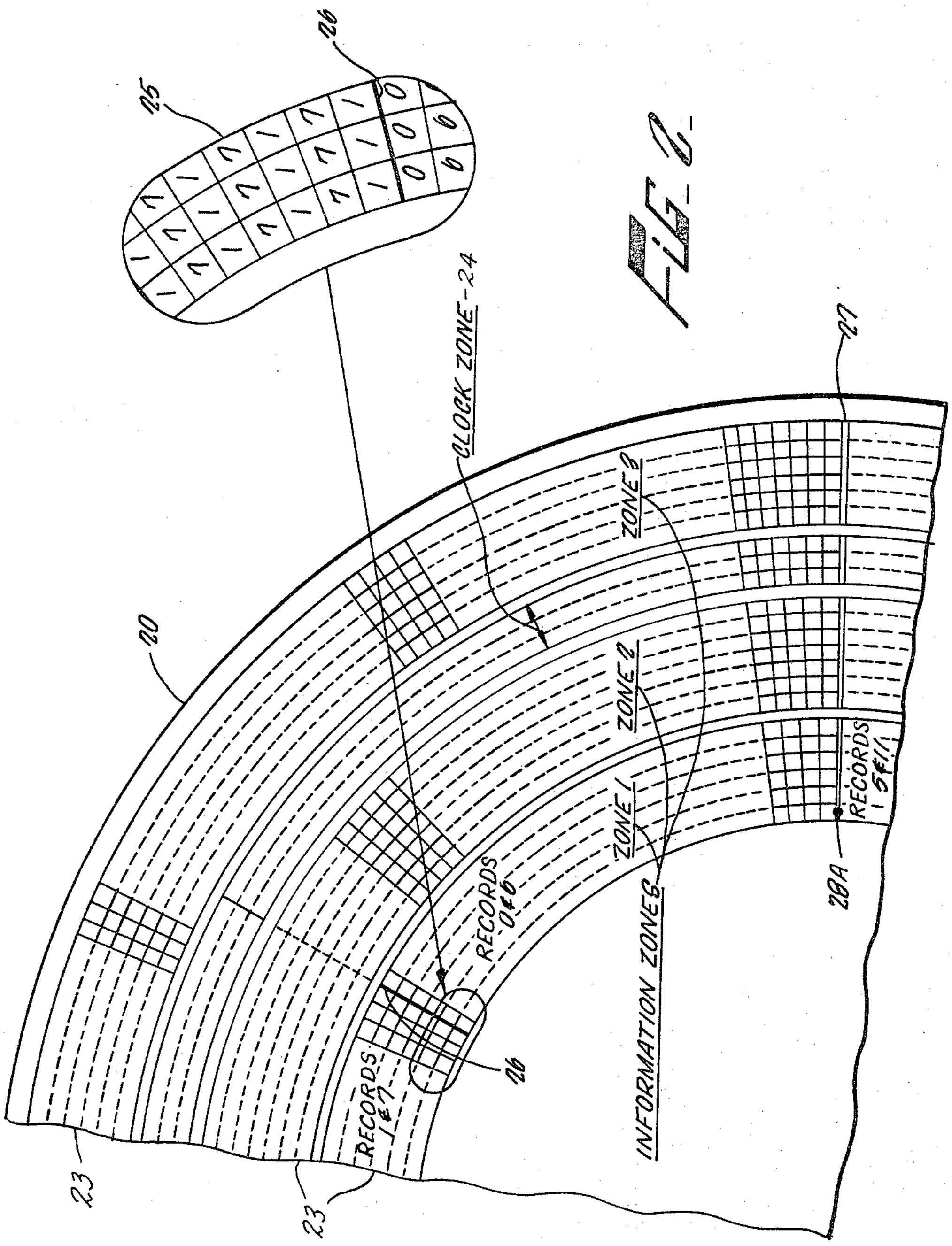
FIG. 2 is a cutaway portion of a segment of a disk file memory store illustrating one possible physical layout of a word interlace pattern, and information and clocking zones of the disk.

FIG. 2 shows one portion of the disk file 20 in which three information zones 23 and one clock track zone 24 are recorded. Three information zones are employed to provide the most efficient use of available recording area at a maximum packing density for this information. Maximum packing density may advantageously be 1000 bits per inch at the innermost track of each zone.

The frequency of each zone is held constant, and therefore, each track moving outward from the center of the disk has its information bits spaced slightly farther apart. Or, put in another way, the recurrence rate at which information bits are recorded is in proportion to the zone's radial distance from the center of the disk. A predetermined number of these information bits define each word stored in the several tracks making up an information zone. Each zone is divided into sectors which have two complete records located therein. The words of each record in a sector are interlaced in the manner shown in the magnified portion 25 of zone 1. The end of a sector marks the beginning of two different records as shown by the dark line 26 of zone 1 for example.

The radial line 27 is one portion of disk 20 which does not have any bits stored thereon and is referred to as a dead space. On a completely blank disk this dead space is marked by a sole information bit 28A which is useful in the recording process to be described hereinafter with reference to FIG. 1.

Figure 3:
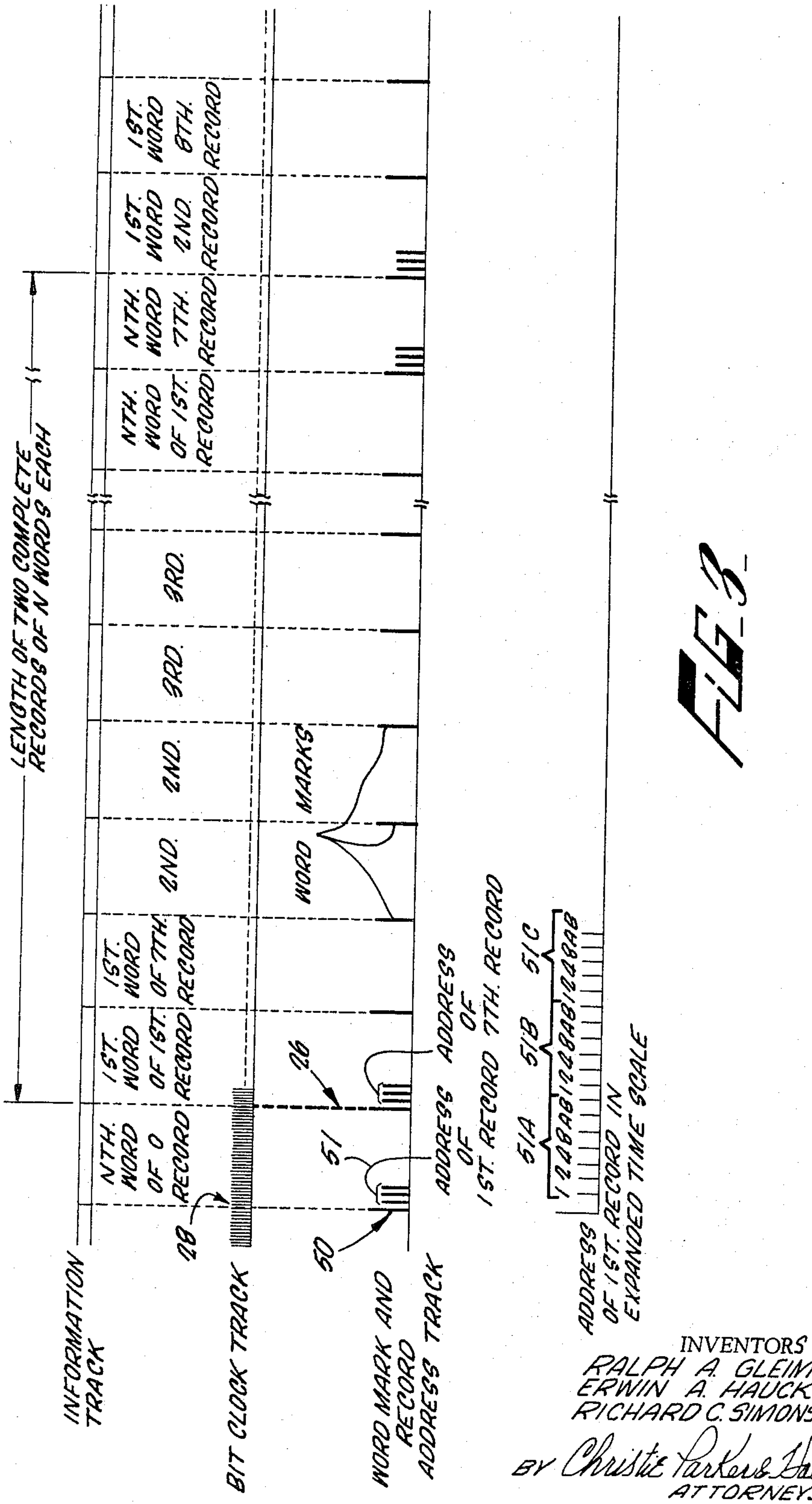
FIG. 3 is a pulse chart depicting the location of information storage signals within the information and clock tracks of the disk of FIG. 2.

Referring now to FIG. 3, an information track, a bit clock track, and a word mark and record address track are shown. Although the words depicted on the information track of FIG. 3 are assigned identifying labels, it should be understood that these words are a continuous train of binary bits and, unless some manner of identifying the beginning and end of these words is provided, such information, when recovered, is meaningless. The bit clock track and the word mark and record address track of FIG. 3 provide a series of impulses which identify the beginning and end of each of the words in an information track.

The bit clock track of FIG. 3 is recorded on disk 20 as a continuous train of signals defined as binary "ones." Synchronized with the bit clock signal indicating the first bit of the Nth word of the zero record is a word mark signal 50 in the record address track. Immediately following in time after word mark 50 is the address of the first record. This address 51, shown in expanded time scale in FIG. 3, precedes the first word of the record which it identifies. This address consists of three characters each made up of six bits. These character bits are synchronized with each of the bit clock signals which follow the bit clock signal 28 marking the beginning of the Nth word of the record zero. The first four signals 1, 2, 4, and 8 of each of the characters 51A, 51B, and 51C are binary coded symbols for the one's unit, ten's unit, and hundred's unit of a 3-digit record identifying number. Both of the last two signals, A and B, of each character of an address are always binary "ones" to distinguish an address character from information words (in which either only A or only B are binary "ones"). The purpose for this assignment of binary "one" values to the A and B bits of the characters of each record identifying number will be made clear hereinafter.

The circuit for recording the signals on the bit clock track and the word mark and record address track of FIG. 3 is shown in FIG. 1 where an adjustable pulse generator 30 is connected through a mode switch 31D, which is preferably linked to switch 31B, to a gated amplifier 32. The output circuit 33 of amplifier 32 is the input circuit for flip-flop 34 which drives the write amplifier 22. An operational flip-flop 35 controls the impedance condition of the gated amplifier 32, and is in turn itself controlled by an input pulse on leads 36 and 37. It was mentioned hereinbefore that each disk is provided with a dead space, or lack of information. Any series of recorded data on a disk file commences at the dead space which has previously had recorded thereon an origin pulse. This origin pulse simply marks the beginning of an information track on disk 20, and is detected by a read amplifier (not shown in FIG. 1) and is applied as an input pulse to input circuit 37. It is this origin pulse via leads 37 and 36 which operates the operational flip-flop 35 to close gated amplifier 32 at the commencement of a bit clock writing sequence.

Prior to actually recording the bit clock signals via write amplifier 22 on disk 20, a series of trial runs are performed in which the write current for amplifier 22 is kept off by the open condition of switch 23 and the inactivation of write current timing circuit 24. Write current timing circuit 24 may be of any circuit known to the prior art which is capable of producing a continuous output for a time duration equal to one revolution of the disk file 20.

During these trials, the adjustable pulse generator 30 produces a continuous stream of signals starting when the origin pulse 28A is received until a predetermined number of signals have been generated. These pulses are monitored by bit counter 38, word counter 39, and sector counter 40. The output of sector counter 40 at lead 41 turns off the operational flip-flop 35 when a predetermined number of pulses have been generated by generator 30. The frequency of generator 30 is adjusted, based on a constant speed for disk 20, such that the predetermined number of signals completely fills one information track beginning and ending with the dead space. Once this adjustment has been set, timing switch 23 is moved to the closed position, and the appearance of the next origin pulse activates both operational flip-flop 35 and the write current timing circuit 24.

Thus, the write current for write amplifier 22 is on for one revolution while pulses from pulse generator 30 are applied via the circuit including switch 31D, gated amplifier 32, lead 33, and flip-flop 34. Flip-flop 4 is a complementing type which during the bit clock writing sequence has its complement inputs 42 and 43 connected to a reference potential source 44. Connected in this manner, flip-flop 34 produces output voltages at the input of write amplifier 22 which causes a reversal of current in write head 21A for each input pulse on lead 33. This write operation, which is standard in the art, records an impulse on the magnetic surface of disk 20 for each output from pulse generator 30.

During the bit clock writing sequence in which the bit signals were placed on disk 20, counters 38 through 40 were monitoring each output from pulse generator 30. At a subsequent time, when word mark and address signals are to be recorded, these counters will emit signals in the form of voltage levels to assure that the word marks and address identifying characters are properly recorded at appropriate intervals in synchronism with the bit clock signals.

When recording the word mark and record address track in the clock zone of disk 20, the pulse generator 30 of FIG. 1 is not employed. Rather, switches 31D and 31B are thrown to the upper terminal and a read amplifier 15, coupled to a read head 21A at the information track which was recorded on disk 20 in the manner just described, recovers each bit clock signal and reproduces these signals as inputs to gated amplifier 32. An origin pulse appearing on input circuit 37 in the manner described hereinbefore activates operational flip-flop 35 to turn on gated amplifier 32 at the beginning of a word mark and address sequence. This origin pulse also activates write current timing circuit 24 through closed switch 23. However, switch 59 to reference potential 45 is not closed as it was during the bit clock track writing sequence, and thus write current is applied to amplifier 22 only for a short duration in accordance with the inputs to OR gate 76 and AND gate 77, rather than during one whole revolution. The reason for this timing of the write current to amplifier 22 will be made clear in the operation described hereinafter.

The outputs of bit counter 38 control this word mark and record address sequence. Bit counter 38 is cleared when the operational flip-op 35 is in its inactive condition and is set to count from zero through a predetermined number based on the number of bits in one complete word. Thereafter, the bit counter 38 recycles to zero, and then recounts through the predetermined number. Voltage levels are produced at output terminals which are shown as BC0 through BC20 and BC55 during the counting operation. For example, if a word consists of 56 bits of information, the bit counter 38 emits a BC0 condition at the initiation of a counting sequence. This BC0 output is employed to control word mark AND gate 17. AND gate 17 has its output connected to complementing input lead 43 of flip-flop 34 through an OR gate 70. Another word mark AND gate 18 is also controlled by an output from bit counter 38, and has its output connected to the complementing input lead 42 of flip-flop 34 through an OR gate 71.

The other input to AND gates 17 and 18 comes from a reference potential 72 upon the closure of word mark write switches 78 during a word mark and address write sequence. The coincidence of an output signal from bit counter 38 at BC0 and the closed condition of switches 78 enables the word mark AND gates 17 and 18. The signal BC0 at OR gate 76 and the output from timing circuit 24 also satisfies AND gate 77 so that write current is present in amplifier 22 at this time. When the first bit signal is read back through closed switch 31D, a word mark signal is written on disk 20 by the first bit signal gated to flip-flop 34 by amplifier 32 in a write operation identical to that described hereinbefore with respect to the bit clock track write sequence. This word mark signal is thus synchronized with the first bit signal in the bit clock track.

Following the remainder of the first count of 56, the bit counter 38 thereafter commences a recount. At the start of this recount, AND gates 17 and 18 are satisfied, so that a word mark signal will again be written on disk 20 in the manner just described.

Referring briefly to FIG. 3 prior to a discussion of the address write sequence, the form of a first address to be written is shown in an expanded time scale. The first word mark 50 is written on disk 20 in the manner described hereinbefore when the bit counter 38 outputs BC0 and BC1 satisfies word mark AND gates 17 and 18. The first bit of character 51A of the address shown in FIG. 3 is synchronized with the second bit to be counted by bit counter 38, and the remaining bits are synchronized with successive bit clock signals. Since an address must follow the word mark which precedes the word mark of the first word of the record it identifies, such addresses require signals from both bit counter 38 and word counter 39 in order to be recorded on disk 20 at the appropriate times. The manner in which an address is recorded by circuit of FIG. 1 is described in full hereinafter.

An address which is to be written on disk 20 of FIG. 1, prior to the turn-on of amplifier 32, is stored in address register 52. This address register is standard in the art and comprises three decade counters which are adapted to make three counts of six units each for the one's, ten's and hundred's units of a decimal address number which is coded in binary form. Thus, by closing panel switches associated with each of the binary digits in the address register 52, a decimal address may be written in binary form into the address register. When register 52 is shifted a total of eighteen times, an address will be shifted out by following the paths shown by arrows 52A, 52B and 52C in address register 52.

Assume, for purposes of illustration, that the address written into address register 52 is number 666. This address in binary form will have panel switches that are associated with the digits circled in address register 52 in a closed position which registers these digits as binary "one's." When a number in address register 52 is cleared out by a shifting operation described hereinafter, the address registered therein follows the paths 52A, 52B, and 52C, and passes out of register 52 on leads 73 and 74 as voltage levels which represent binary "one's" or "zeros." Immediately thereafter an output signal from AND gate 63 advances the address number in address register 52 by a count of 1. After this advance, the address number 667 is stored in address register 52 and is ready to be shifted out and written on disk 20.

A writing and shifting operation of address register 52 is conditioned upon the appearance of the proper input conditions at AND gates 56, 60, 61 and 67. AND gate 56 has one input lead 55 connected to an input lead 57 of write address flip-flop 58. Input lead 54 of AND gate 56 comes from a plurality of output circuits BC2 through BC19 of bit counter 38.

Several groups of these output signals BC2 through BC19 may be delivered to AND gate 56, but no shifting will occur in address register 52 unless an input signal from write address flip-flop 58 is present on input 55 of AND gate 56. This second input signal to AND gate 56 is delivered only after the word mark of the last word of the record immediately preceding the location of the record address stored in address register 52. The manner in which this operation is accomplished may best be understood by a brief reference to FIGS. 2 and 3.

In FIG. 2 records 0 and 6, and 1 and 7 are in contiguous sectors, and records 2 and 8, 3 and 9, 4 and 10 (not shown), and 5 and 11 are in other successive sectors counterclockwise in zone 1. The addresses identifying each of these records appear in the word mark and record address track in the clock zone 24 and are physically located on opposite sides of the sector dividing lines when these lines are extended radially into the clock zone. For example, if sector dividing line 26 were extended to the clock zone 24 by the dashed line shown, the addresses for the records 1 and 7 would be located following the word marks on either side of this dividing line. Merely for illustration purposes, this sector dividing line 26 is shown in dashed lines on the word mark and record address track of FIG. 3 between the addresses for records 1 and 7.

In view of the foregoing, it is clear that although each record in the disk file is identified by its own unique decimal address number, successive addresses identify records having numbers which do not follow in sequence. All of the alternate record addresses, however, follow in numerical sequence in one zone. Thus, it is essential when recording record address identifying numbers that only every other address is written in one sequence during one revolution of the disk file 20. This procedure allows the writing of record addresses in their normal numerical sequence and requires two full revolutions on the same address track to completely address one zone.

To achieve the above described writing procedure, the word counter 39 is preset to count one less than the total number of words in one sector. This number of words is counted by having the previously cleared word counter 39 advance on count for every 56 bit count in bit counter 38 as indicated by output signals on BC0 connected between the bit counter 38 and word counter 39. At the end of this word count, the word counter 39 delivers a pulse on output lead WC0 to AND gates 65 and 67. When the bit counters output BC1 and word counter output WC0 are coincident at AND gate 67, an output is delivered therefrom to write address flip-flop 58. This output signal activates the write address flip-flop 58. Coincidentally with the activation of the write address flip-flop 58 at time BC1, is the enablement of shift control AND gate 56, OR gate 76, via lead 78, and write current control AND gate 77. Also coincident at this time is the application of an input signal to the address write AND gates 60 and 61.

Inasmuch as the identity of the address sought to be recorded on disk 20 has previously been stored in address register 52, the next bit clock signal which appears on shift lead 53 causes the first of a series of shifting operations in address register 52. A first shift in address register 52 reads out from that register the binary value of the digit shown in the uppermost right hand corner of register 52. AND gates 60 and 61 monitor the "one" and "zero" output leads 73 and 74 from address register 52 and drive the complementing leads 42 and 43 of write flip-flop 34 through OR gates 70 and 71. In a manner similar to that described hereinbefore, each bit value shifted from address register 52 will be written by write head 21A on disk 20. A complete address as shown in FIG. 3 requires three 6-bit characters, or a total of 18 bits. In order to write a complete address, therefor, address register 52 must be shifted by the bit clock signals on shift lead 53 a total of 18 times. The commands for these 18 shifts come from bit counter 38 outputs BC2 through BC19, at the input leads for the shift control AND gate 56.

As described hereinabove, only every other address is written during the first revolution of disk 20 so that these addresses may follow each other in numerical sequence, even though the records which they identify are interlaced on disk 20. This procedure requires two complete revolutions of disk 20 in order that all the record identifying numbers assigned to one information zone may be written in one word mark and record address clock track. Referring to FIG. 2 for purposes of example, the addresses for records 0 through 5 would be written in the first revolution of disk 20, and addresses for records 6 through 11 would be written during the second revolution of disk 20.

During the above described counting operation, output signals from BC55 of bit counter 38 and WC0 of word counter 39 have satisfied AND gate 65 once for every address written. Sector counter 40 is preset to count up to the number of addresses in all the sectors of one zone, and then deliver an output signal SC0. Thus, when the last record identifying address is written, the sector counter 40 delivers output signal SC0 to operational flip-flop 35 in order to end the word mark and record address write sequence.

The principles of this invention, of course, are not limited to interlaced words of two different records per sector. The sector may have words of more than two interlaced records stored therein or it may contain only one record of successive words. Furthermore, the separate steps of bit signal writing and bit signal reading in order to establish a timing basis for writing word marks and addresses may be replaced by a signal step in which bit signals are written in the bit signal clock track simultaneously and in time synchronism with the writing operation for word mark and absolute address signals.

In order for bit signal writing to take place simultaneously with mark and address writing, two write amplifiers are employed and all writing takes place during one revolution of a memory disk.

Figure 1A:
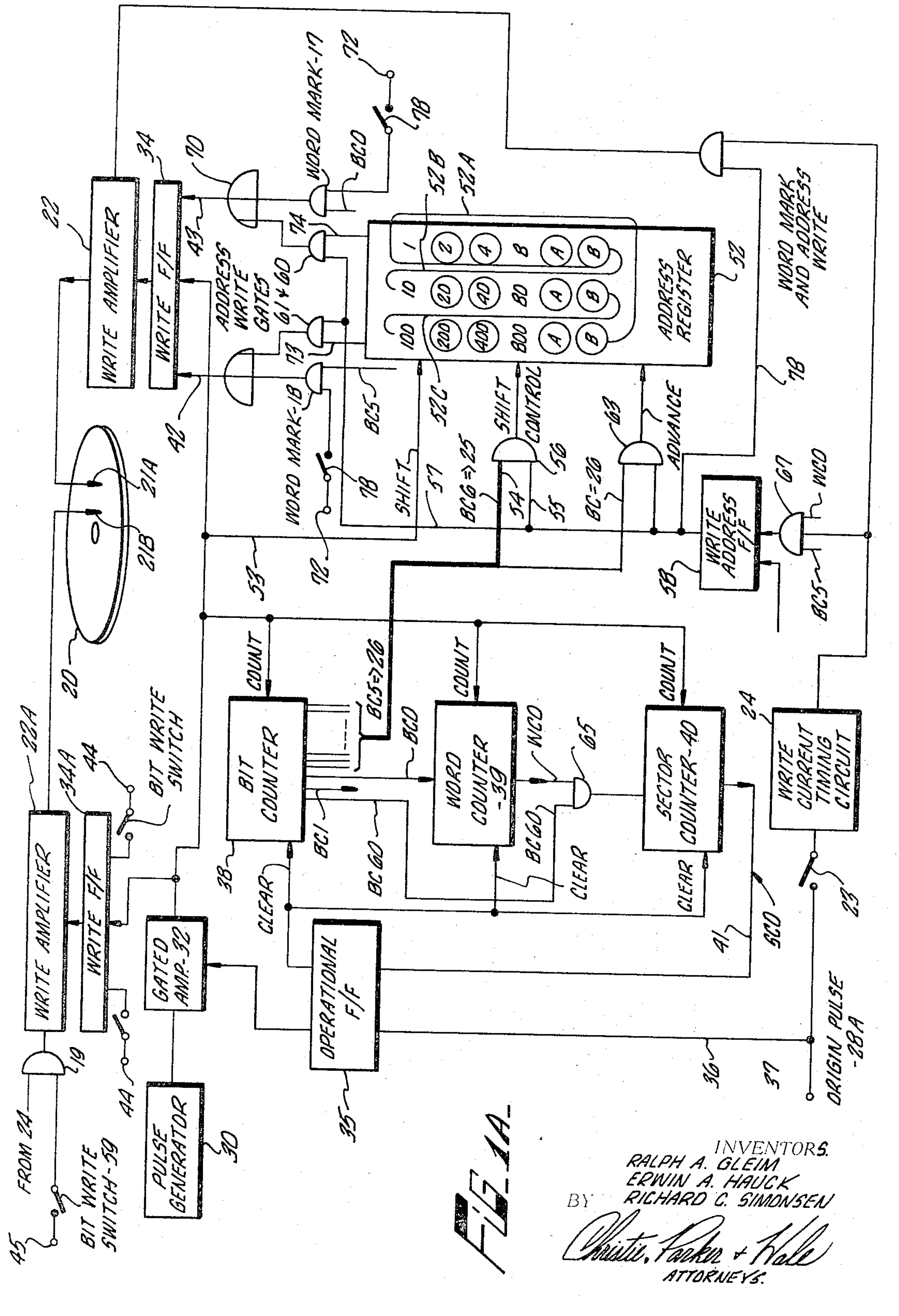
FIG. 1A is a block diagram of an alternate information recording circuit embodying the principles of the present invention.

In FIG. 1A much of the circuitry of FIG. 1 is repeated except that a synchronized bit writing and word mark and address writing operation is provided by the employment of two write amplifiers 22 and 22A. Gated amplifier 32 supplies pulses from pulse generator 30 in the manner described hereinbefore. Bit writing switches such as 59, the bit writing potential 44, and a bit writing flip-flop 34A function in a manner similar to that described hereinbefore to supply a continuous train of bit marking signals to one track of the clock portion.

Comparison of the bit counting outputs of bit counter 38 of FIG. 1A with those of FIG. 1 discloses a difference in the sequence of word mark writing. The word mark signal written in accordance with the technique of FIG. 1 was of one bit duration, while the word mark written in accordance with FIG. 1A is of five bits duration. In a similar and corresponding manner every word is followed by a dead, or buffer, space of equal bit duration to the bit duration of the word mark.

The use of a several bit duration word mark and an equal duration buffer space between words, offers several advantages in avoiding unpredictable time variations in the memory disks. For example, it has been discovered that temperature and vibration tend to disturb the positional time sequence of bit locations during reading and writing operations. Thus, one particular bit position in the information portion of a disk upon writing may be properly synchronized with, for example, the first bit position of a given word mark in the clock portion. Then, upon a subsequent reading operation, temperature and mechanical variations may have deformed the disk slightly to the extent that the same information bit position is now displaced a few bit positions relative to the first bit position of the given word mark with which it was previously synchronized.

Although varying slightly from one memory disk file system to another disk file system, it has been discovered that a five bit duration for the word mark signal and a five bit buffer space between words guards against any errors due to bit position displacement. Thus, any bit position displacement which may exist due to temperature or mechanical variations, still assures time alignment of the first information bit of the first word wi.h at least some portion of the word mark signal thus assuring that all bits of the first and subsequent characters of the first and other words of an addressed record are fully recovered in their proper time sequence.

In the operation of FIG. 1A, a leading edge of a several bit duration word mark is written by bit count BC0 at word mark gate 17, as applied through OR gate 70, write flip-flop 34, write amplifier 22 and word mark and address track head 21A. The trailing edge of this word mark is written by bit count BC5 via similar circuitry which complements write flip-flop 34. Thereafter, addresses are written following appropriate word marks in the same manner as described hereinbefore. A five bit buffer space between words is provided by an output lead designated as BC60, as compared to an original word capacity in FIG. 1 as designated by an output lead BC55. The balance of the operation of the circuit of FIG. 1A is substantially the same as that described hereinbefore and need not be discussed in further detail here.

Figure 4:
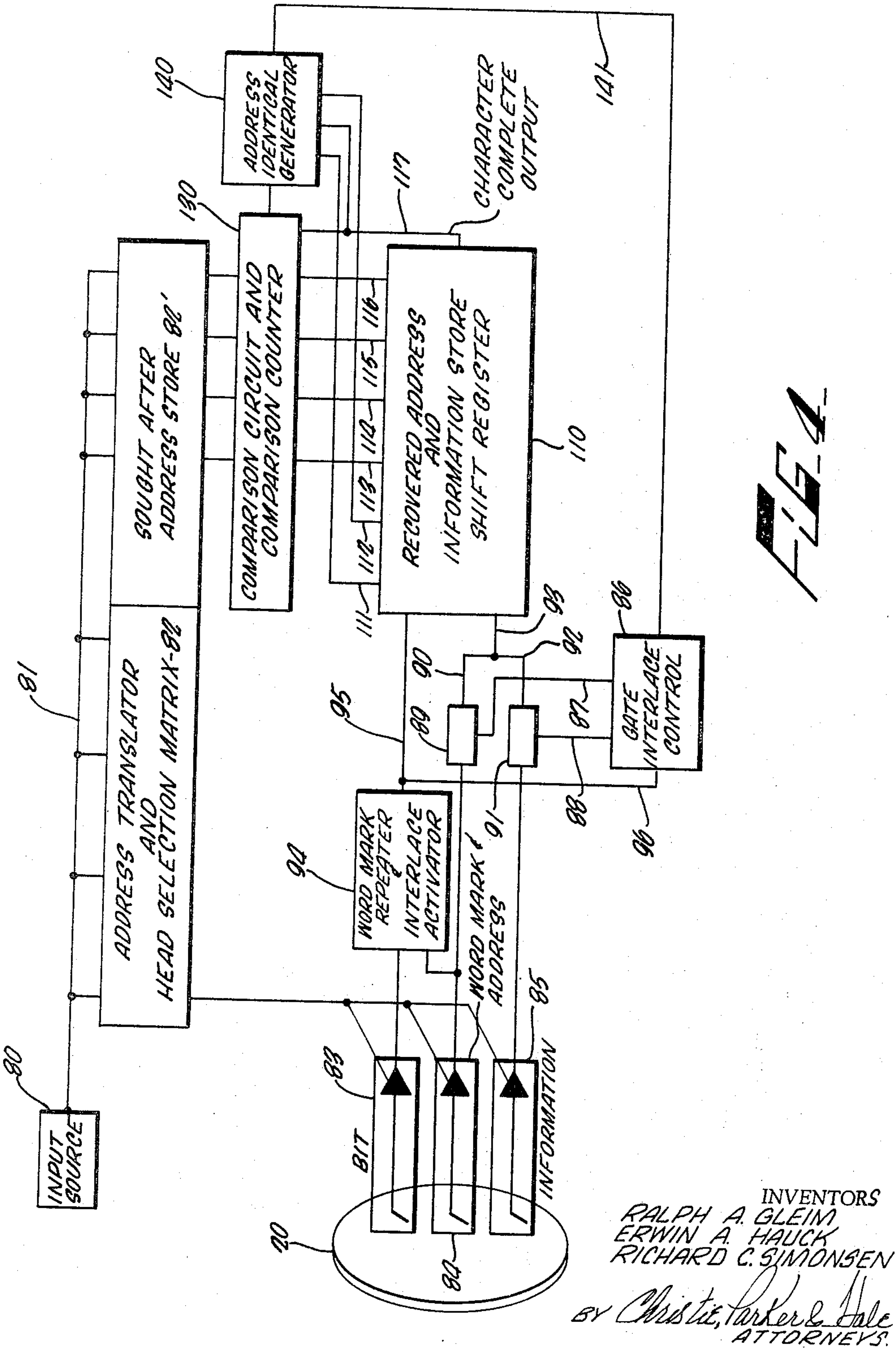
FIG. 4 is a block diagram of an address retrieval circuit embodying the principles of this invention.

Referring now to the circuit of FIG. 4, a block diagram of a new and improved circuit for either recovering or recording information of an interlaced record addressed in accordance with the principles of this invention is shown. Input source 80, which may advantageously be a computer, sends several binary coded decimal digits in parallel from output lead 81 to an address translator and head selection matrix 82, and a sought after address store 82′. The binary coded digits on lead 81 include more information than the three binary coded decimal digits of the record identifying address which are stored in the circuit 82′. These other digits are employed by circuit 82′ to select the various heads of a disk file system, which heads are assigned to the tracks associated with a sought after address. For example, a total decimal word may include up to seven binary coded decimal digits. The most significant digit of this code would select one of several possible retrieval circuits, only one of which is shown in FIG. 4. The remaining digits, other than the address digits, are processed by the translator and head selector matrix 82 to turn on a desired information head 85 of one track in one zone of the three zones on a selected disk face. Also chosen by this translation operation is a pair of bit and word mark and address heads 84 and 85 respectively for the clock tracks identifying the location of information in the chosen information zone which includes the selected information track. The translation of these digits to make such a selection may be accomplished by any known translator and matrix and such a translation operation is not a part of this invention.

Assuming completion of the above-mentioned translation, a bit head and amplifier circuit 83, a word mark and address head and amplifier circuit 84, and an information head and amplifier circuit 85 are chosen and activated by the translator 82. At the time of activation of these heads, the data on disk 20, which is continuously rotating, is read by the heads 83 through 85. Inasmuch as disk 20 is continuously rotating, the circuit of FIG. 4 must identify the sought after record.

In accordance with the principles of this invention, each record address, which appears prior to the record it is identifying, is recovered and compared with the sought after address. If the recorded address and the sought after address are identical, the retrieval circuit automatically recovers the information stored in the information track of the sought after record.

In accordance with our invention, a gate interlace control circuit 86, which may advantageously be any two-state switch device such as a flip-flop, is set in a state which normally holds gate 89 in a low impedance condition by an output signal on lead 87. Gate 89 is an address gate which allows signals read from the word mark and record address track by circuit 84 to pass, via leads 90 and 93, into the recovered address and information store shift register 110. This shift register 110 has its output leads 111 through 117 connected to a comparison circuit and comparison counter 130 and an address identical pulse generator 140.

Prior to the storage of any address identifying number read by head 84 through gate 89 to shift register 110, the word mark repeater and interlace activator circuit 94 performs a clearing operation via a signal on lead 95. When a complete character of an address identifying number is stored in shift register 110, a comparison operation between the first character of the address and the first character of the sought after address is accomplished. If this comparison finds the recovered address and the sought after address characters to be identical, one valid character of the sought after address is counted by the comparison counter circuit 130. At the same time, output leads 111, 112 and 117 of shift register 110 are monitored by the address identical pulse generator 140, in a manner to be described more fully hereinafter so as to determine when three complete address characters have been recovered. Comparison of the remaining two characters of the address identifying number read by head 84 is performed by the comparison circuit 130. If three valid address characters have been noted by address identical pulse generator 140, and three identical comparisons have been counted by comparison counter 130 then an output pulse is generated on lead 141 by the pulse generator 140. This output pulse signifies that the sought after address has been recovered and conditions the gate interlace control 86 so that the next word mark repeated by the circuit 94 changes the state of the gate interlace control 86. Since it was described hereinbefore that the record identifying address number is stored on disk 20 prior to the actual appearance of the word mark which identifies the first word of the upcoming record, this operation allows word mark repeater 94 and gate interlace control 86 to automatically place the information gate 91 in a low impedance condition at the proper instant when the first bit of the first word of the sought after record appears beneath the information head 85 on disk 20.

The information stored in the first word of the sought after record is conducted through gate 91 via leads 92 and 93 into the information storage shift register 110. It should be recalled that each word of the desired record is interlaced with words of a record other than the sought after record. Thus, only the bits of every other word are read and stored in the information shift register 110. This alternate word selection is referred to as a "read-a-word, skip-a-word" operation.

During the read-a-word portion of this operation, information gate 91 is held on by gate interlace control 86. When a word mark, signaling the beginning of a word which is to be skipped, is read by the address read head 84, this word mark is repeated by the repeater circuit 94, and the gate interlace control circuit 86 is changed back to its normal word mark and record address reading state. If during this address reading state no new address is recovered, the address identical pulse generator 140 holds a valid comparison signal at lead 141. Gate interlace control 86 continues to be conditioned, or primed, by this signal so as to change state upon reception of the word mark which introduces the second word of the sought after record. This read-a-word, skip-a-word operation continues until an address of a new upcoming record is read. At this time, an address character will be stored in shift register 110 which does not match the address character of the previously sought after address stored in circuit 82′.

The presence of an address in shift register 110 which does not match the sought after address in store 82′ causes the action control flip-flop 142 to be reset. This reset is done by an AND gate 144 coupled to the output of the address character counter 138, the character complete output lead 117, and the output of flip-flop 142 (FIG. 5).

Accordingly, address identical pulse generator 140 removes the address identical signal from lead 141. With this signal removed, gate interlace control 86 is not conditioned to change state upon reception of the next word mark, and the system continues searching for addresses.

Figure 5:
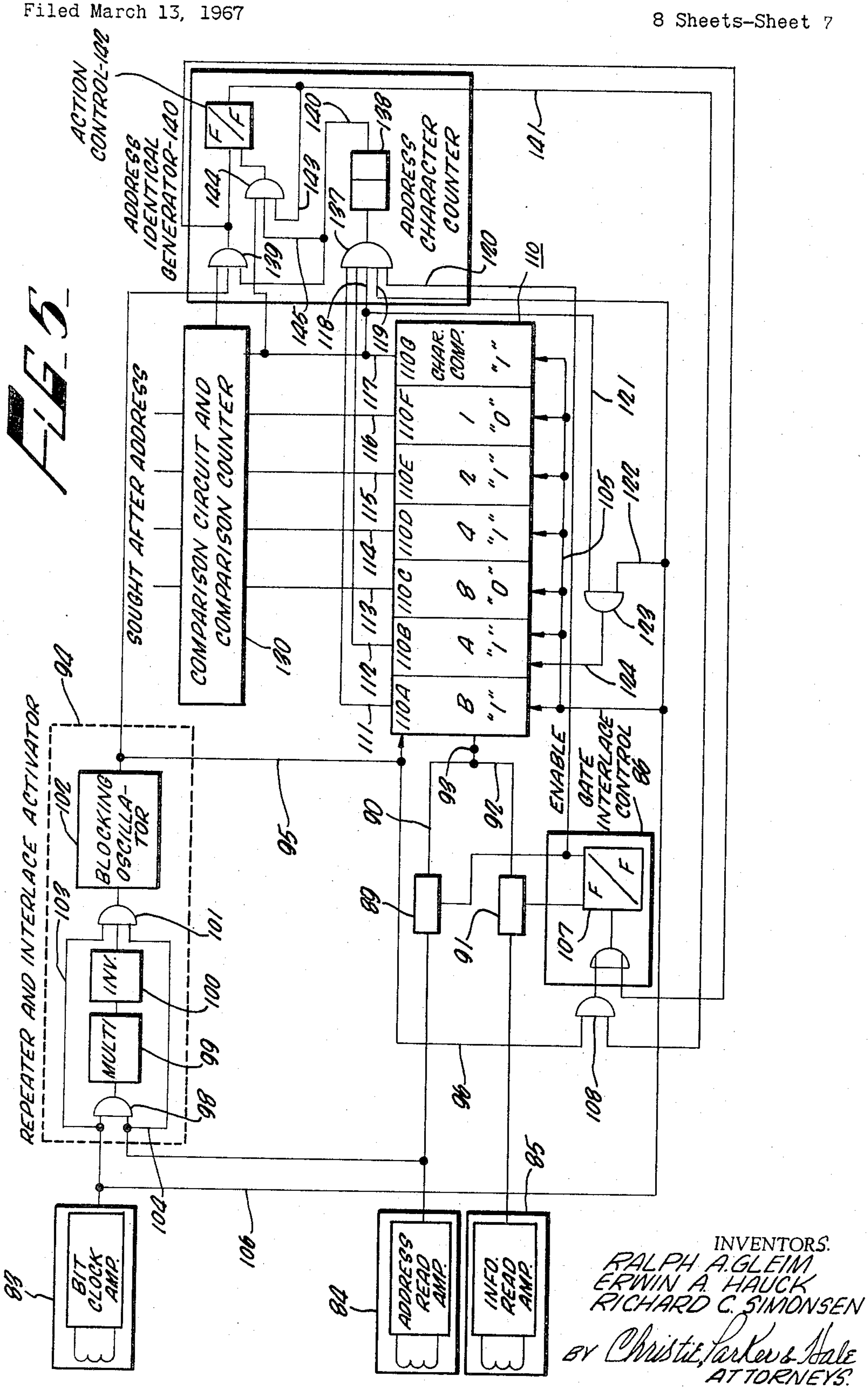
FIG. 5 is a combination schematic circuit and block diagram illustrating in greater detail certain portions of the circuitry of FIG. 4.

Referring now to FIG. 5, the details are supplied for the word mark repeater and interlace activator 94, the address identical generator 140, the gate interlace control 86, and the shift register 110 of FIG. 4. Certain of the elements of FIG. 4 have been repeated in FIG. 5, and where there is a correspondence, such elements are similarly numbered.

The address translator 82 and the sought after address store 82′ of FIG. 4 are not repeated in FIG. 5; but assume, for purposes of illustration, that a record identified by the number 666 is the sought after address that is translated and presented to comparison circuit 130. After the translation is completed, the appropriate clock and information amplifier and read head circuits 83, 84 and 85 are activated.

Figure 6:
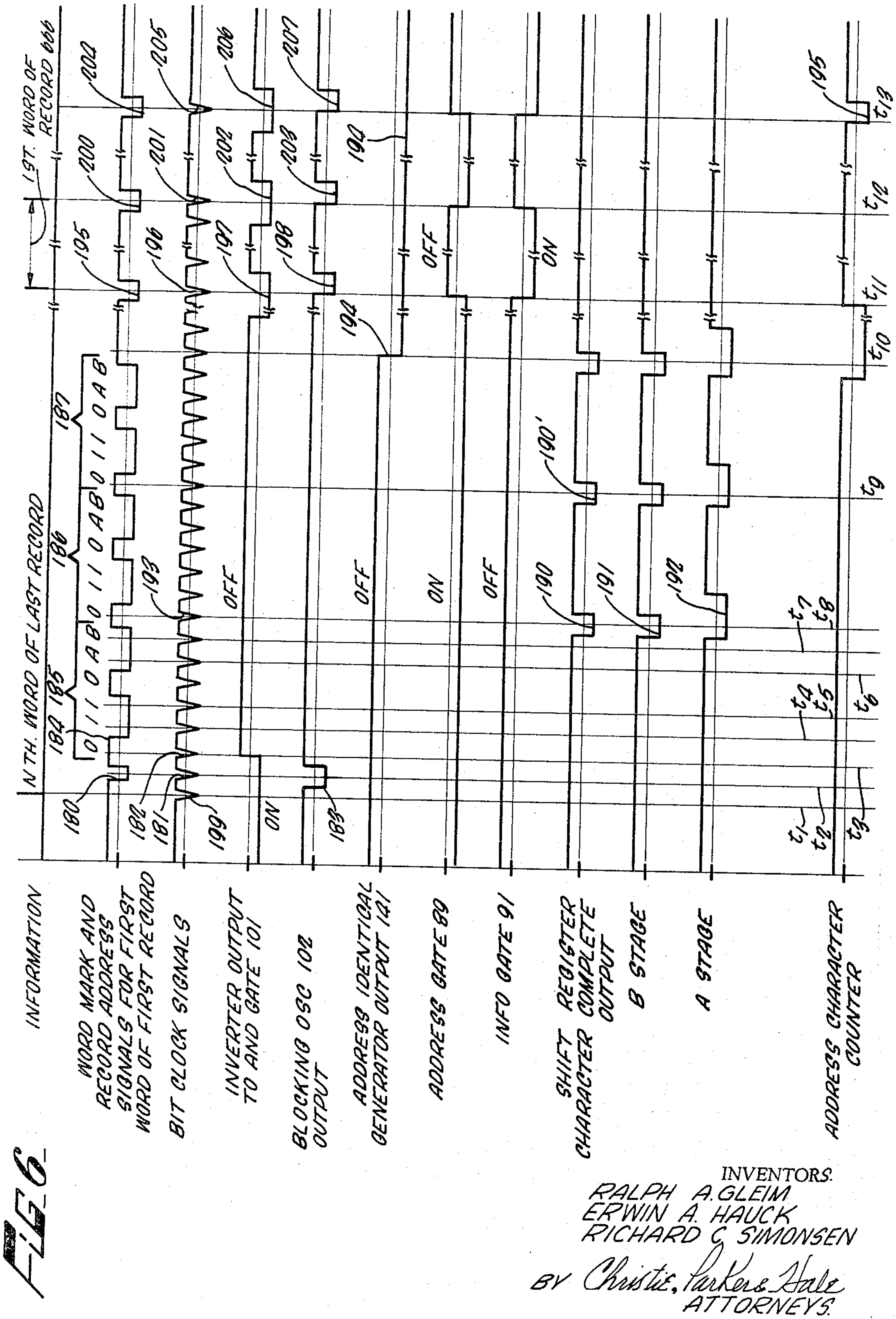
FIG. 6 is a pulse wave form chart useful in promoting a full understanding of the operation of the circuitry of FIG. 5.

The binary coded sought after address 666, which is preceded by a word mark 180, is shown in FIG. 6. This word mark 180 identifies the beginning of the Nth, or last, word of the record immediately preceding record 666. The first word of the sought after address in the information track immediately follows the Nth word of the last record.

At time interval $t_1$ of FIG. 6, prior to the appearance of word mark 180, the wave forms of various circuit elements of FIG. 5 are depicted. As shown by these wave forms, address gate 89 is enabled, and information gate 91 is disabled. This gate condition allows the word mark 180 and record address 666 to be gated into the address shift register 110 in the manner described hereinafter. This shift register 110 is standard in the art and has seven stages shown as blocks 110A through 110G. A single insert and clear circuit 95 is coupled through shift register 110 from the interlace activator circuit 94. Information to be stored in shift register 110 is fed into each stage by an input circuit 93 which, in turn, is coupled to the address and information gates 89 and 91, respectively. Shifting in the register 110 is controlled by the shift circuit 105, which is connected to an output 106 of bit clock amplifier 83. This shift circuit causes the information stored in a stage to shift one complete stage for each clock signal delivered by the bit clock amplifier 83. Each stage 110A through 110G of shift register 110 has an output lead 111 through 117, respectively. Output leads 113 through 117 are connected to the comparison circuit and counter 130. The first two output leads 111 and 112 from stages 110A and 110B of the shift register serve as two input leads to a 5-input AND gate 137 of address identical generator 140. Outputs 113 through 116 of shift register 110 present the number portion of the recovered address to circuit 130 for comparison with the sought after address. The last output lead 117 of shift register 110 is connected to input 118 of an AND gate 137 and input 121 of feedback AND gate 123. This feedback circuit, which places a one output condition into stage 110B and clears all the remaining stages, performs the insert and clear operation of circuit 95 for the second and third characters of each address. It will be described in full hereinafter.

Another input term for AND gate 137 is from lead 120 which is connected to the enable side of flip-flop 107 in the gate interlace control circuit 86. The final input term for AND gate 137 is from output 106 of bit clock amplifier 83. Signal coincidence at all five inputs of AND gate 137 will cause the address character counter 138 to register a count of one. This character counter 138 is a standard two-stage binary counter in that it counts once for each signal delivered to it. An output signal is taken from character counter 138 at a count of three, and is presented to AND gate 139. The other inputs for AND gate 139 comes from comparison counter 130 and word mark repeater 94. Signal coincidence at gate 139 activates the action control flip-flop 142 and also triggers the gate interlace flip-flop 107 in response to equality between all digits of the sought after and recovered addresses. When action control 142 is activated, an input level is held present on input lead 143 of AND gate 144. This signal level and a subsequent signal on lead 145 from character counter 138 will deactivate action control circuit 142. Thus, a valid comparison activates action control 142 while an invalid comparison deactivates, or resets, it. The active condition of action control 142 produces a priming signal via lead 141 to gate interlace control 86. This priming signal at lead 141 must be present before the interlace activator 94 can cause the flip-flop 107 to change its state.

Prior to discussion of the operation of the retrieval circuit of FIG. 5 upon reception of the word mark signal 180 and address 666 of FIG. 6, the detailed operation of repeater and interlace activator circuit 94 should be noted. This circuit 94 comprises an AND gate driven monostable multivibrator 99, an inverter 100, an AND gate 101, and a blocking oscillator 102. The inputs for driving AND gate 98 come from the output of bit clock amplifier output 83, and the output of address read amplifier 84. Signals which satisfy AND gate 98 are also conducted through leads 103 and 104 to the input side of AND gate 101. As shown at time $t_1$ of FIG. 6, inverter 100 inverts the normally OFF condition of monostable multivibrator 99 and thus delivers to AND gate 101 a signal 199 which tends to satisfy that gate. At time $t_1$, a second signal which tends to satisfy coincidence at AND gate 101 is delivered from the bit clock amplifier 83. Inasmuch as no signal is present from the output of address read amplifier 84 at time $t_1$, AND gate 101 is not enabled and the blocking oscillator 102 is maintained inactive.

At time $t_2$ the word mark signal 180 is read by the address read amplifier 84 in synchronism with the bit clock signal 181 which is read by the bit clock amplifier 83. These signals 180 and 181 provide coincidence at AND gate 98 which activates the series-connected multivibrator 99 and inverter 100. The inverted output from inverter 100 tends to establish a false, or nonsatisfying, condition at the input of AND gate 101. However, since the multivibrator and inverter circuit are not instantaneous in operation; but rather, are timed to have a slow response this false condition does not appear until after both signals 180 and 181 have been conducted through leads 103 and 104 to AND gate 101. It will be recalled that the inverter output at time $t_2$, as shown by FIG. 6, was of the same polarity as signals 180 and 181. Thus, at time $t_2$ AND gate 101 is satisfied and it triggers blocking oscillator 102. This blocking oscillator 102 is standard in the art and causes a single short duration output pulse 183 to be generated. This pulse is fed into shift register 110 over line 95 and performs an insert bit and clear operation which places the first stage 110A of shift register 110 in a "one" condition, and places stages 110B through 110G in a cleared, or "zero," condition.

At time $t_3$, the inverter input to AND gate 101 changes to a false condition.

At time $t_4$ the first bit 184 of the first character 185 of the address being recovered, and a bit clock signal 182 are read by the bit amplifier 83 and address amplifier 84, respectively. The bit clock signal 182 shifts the binary "one" condition established by blocking oscillator output 183 from stage 110A to stage 110B. Simultaneously with this shifting operation, the pulse 184 representing a "zero" in the record address is stored in stage 110A of shift register 110. This operational sequence repeats itself for each of the five remaining bits of the first character of the record address until that first character is fully stored in all stages of shift register 110. As the last bit of the first character of the record address is stored, the original bit inserted by the blocking oscillator output 183 is shifted to the extra, or character complete, stage 110G. The binary values stored in shift register 110 at this time are shown in FIG. 5 in stages 110A through 110G of shift register 110.

With shift register 110 filled with the first character of the record address 666, voltage conditions representative of binary "one's" appear at output leads 111, 112, 114, 115 and 117 of shift register 110. The voltage condition at output lead 117 is shown as pulse 190 in FIG. 6, and is an input to comparison circuit 130 and AND gates 137 and 123. Output pulse 190 activates the comparison circuit and the first character of the recovered address is compared with the first character of the sought after address. In this case, one true comparison is counted by comparison counter 130 in the following manner.

When the character complete output pulse 190 appears at time $t_8$, the input conditions for AND gate 137 are satisfied since pulses 191 and 192 are present on output leads 111 and 112, a bit clock signal 193 is present at lead 119, and an enable condition from flip-flop 107 is present on lead 120. The coincidence of these input signals at AND gate 137 causes one output signal to be delivered and counted by the address character counter 138. This character, by being registered as a "one" in counter 138, is an indication that one complete character has been recovered and compared.

Simultaneously with the enablement of AND gate 137 at time $t_8$ is the enablement of AND gate 123 which is connected in a feedback loop from the output of the shift register 110. This feedback performs the same insert bit and clear operation for the second character 186 that pulse 183 performed for character 185. Thus, stage 110B is in a "one" condition, and the remaining stages 110C through 110G are cleared. This feedback circuit is isolated from stage 110A so as not to disturb the information being stored therein.

The second character of the record address is read, stored, and compared at time $t_9$ by the operation just described. Character complete output pulse 190′ activates the comparison circuit and comparison counter 130, and the recovery of a second valid character is noted by the comparison circuit 130. At the same time, the address character counter 138 is advanced in order to indicate that two complete characters have been recovered and compared.

The third and final character 187 of the record address identifying number is recovered and compared at time $t_{10}$ by the operation just described. Since both the comparison circuit and counter 130 and the address character counter 138 are satisfied that three complete and valid address characters have been recovered, coincidental signals are presented by these counters to AND gate 139 of address identical pulse generator 140. The resultant output from gate 139 sets the action control flip-flop 142 in a state which delivers a continuous priming signal 194 to the interlace gate control 86.

Since the operation just described has determined that the address for the upcoming record has been recovered, the next word mark 195 at time $t_{11}$ signals the first word to be read from the information track. The circuit of FIG. 5 automatically stops its address reading operation, and starts reading information upon the reception of word mark 195. This automatic operation is accomplished when the blocking oscillator 102 is triggered by coincidence of signals 195, 196 and 197 at AND gate 101 at time $t_{11}$. Blocking oscillator output 198 and address identical generator output 194 enable AND gate 108 in gate interlace control 86. Enablement of AND gate 108 causes gate interlace flip-flop 107 to change state and reverse the impedance conditions of gates 89 and 91. Thus, at time $t_{11}$, as shown in FIG. 6, information gate 91 is ON, and the first word of the sought after record is read into shift register 110.

It should be noted that during the address recovery operation described hereinbefore, coincidence of "one's" in bit clock signals occurred at the input of AND gate 98 of circuit 94 several times. For example, such coincidence occurred at times $t_4$, $t_5$, and $t_6$, and $t_7$ for the first character 185 of the address, and at similar intervals for each of the other two characters 186 and 187. This signal coincidence satisfies AND gate 98 of repeater 94, and serves to retime multivibrator 99 and keep it in an active condition. These coincident signals do not trigger the AND gate 101 of repeater 94, since the inverter output to AND gate 101 acts as an inhibit for that gate.

The inhibit operation mentioned above, which is present after word mark 180, ends before the appearance of word mark 195. After the final character 187 of the address has been recovered, the remainder of the address track is in a "zero" state. Thus, during the remainder of the address track no coincidental signals appear at the input of AND gate 98, and the multivibrator circuit 99 is not retimed. Shortly after the final character 187 is recovered, the multivibrator 99 reverts to its normally inactive condition. This inactive condition is inverted and presented as a true input to AND gate 101. Thus, at time $t_{11}$, the inverter output to AND gate 101 is in a true condition, and the coincidence of a word mark signal 195 and bit signal 196 satisfy this AND gate 101. Blocking oscillator circuit 102 is activated, and the gate interlace flip-flop 107 alters the impedance conditions of gates 89 and 91.

Thereafter, during the interval $t_{11}$ through $t_{12}$ information in the information track is read by the information read head and amplifier circuit 85, and is gated via the circuit comprising gate 91, leads 92, 93 into shift register 110. The information thereafter stored in shift register 110 is utilized by circuits not shown in FIG. 5 for a standard computing operation.

Since the information words for the sought after record are interlaced with information words of some other record, the next word mark 200 at time $t_{12}$ identifies the beginning of a word of an undesired record. This word is not read, however, due to a change in the impedance conditions of gates 89 and 91. Multivibrator circuit 99 times out during the interval $t_{11}$ and $t_{12}$, and becomes inactive. This inactive condition is inverted by inverter circuit 100 and presented to AND gate 101. At time $t_{12}$, the coincidence of a word mark signal 200, a bit clock signal 201, and the inverter input 202 in the manner described hereinbefore, causes the blocking oscillator 102 to produce an output signal 203. Coincidence of this oscillator output 203 and the address identical output from action control circuit 138 again changes the state of flip-flop 107 of gate interlace control 86 in order to return the impedance states of address gate 89 and information gate 91 to an address reading condition. During the interval $t_{12}$ through $t_{13}$, the address and information storage shift register 110 is storing address information, and is skipping a word at the information track. This read-an-address, skip-a-word and read-a-word, skip-an-address process continues until the last word in the desired record has been read, and a new record address is recovered and compared in the manner just described.

For example, if a new address is located after the word mark pulse 204 in FIG. 6, the comparison operation is performed in the manner described hereinbefore. Since the next recovered address does not compare with the sought after address, the output of the comparison circuit 130 will be OFF. However, the output from action control 142 will still be ON, and the output from address character counter 138 will be ON, as is the output of the stage 110G to AND gate 144, and the action control flip-flop 142 is reset. With the action control flip-flop 142 reset, the prime condition heretofore applied to AND gate 108 of gate interlace control 86 is removed. Thus, the next word mark after word mark 204 will not activate the gate interlace control circuit 86, and address gate 89 remains in an address reading low impedance condition. The circuit of FIG. 5 thereafter continues reading addresses until a valid address is recovered, and the operation hereinbefore described repeats itself.

It is, of course, inherent in accordance with the foregoing description that the control input source 80 may insert the next upcoming address in the address store 82′ so as to provide an uninterrupted record reading operation. By this technique continued record reading can take place until control input source 80 signals, as by its failure to supply the next upcoming address, that record reading is to halt.

Furthermore, it is inherent in the operation of the circuit of FIG. 4 and FIG. 5 that control input source 80 may supply to the address identical generator 140 a signal indicating that a record reading operation is complete, rather than relying upon the discrepancy between a sought after address and the next upcoming address.

Although the invention has previously been described with reference to an interlaced format for memory disks 20, it was mentioned hereinbefore that a noninterlaced format in which each sector includes one record having the words thereof successively following each other is within the scope and principles of this invention. When a noninterlaced format is employed, the absolute address in the clock portion of the memory disk, again precedes the first word of the record it identifies. As was true for an interlaced format, when the absolute address is recovered from the address track in the clock portion and it matches a sought after address, an information gate connected between a read-write information head and a shift register is gated ON so as to store or recover the various words of the addressed record. A noninterlaced format and its associated information handling system are depicted in FIGS. 4A and 4B and are described in more detail hereinafter.

Figures 4A, 4B:
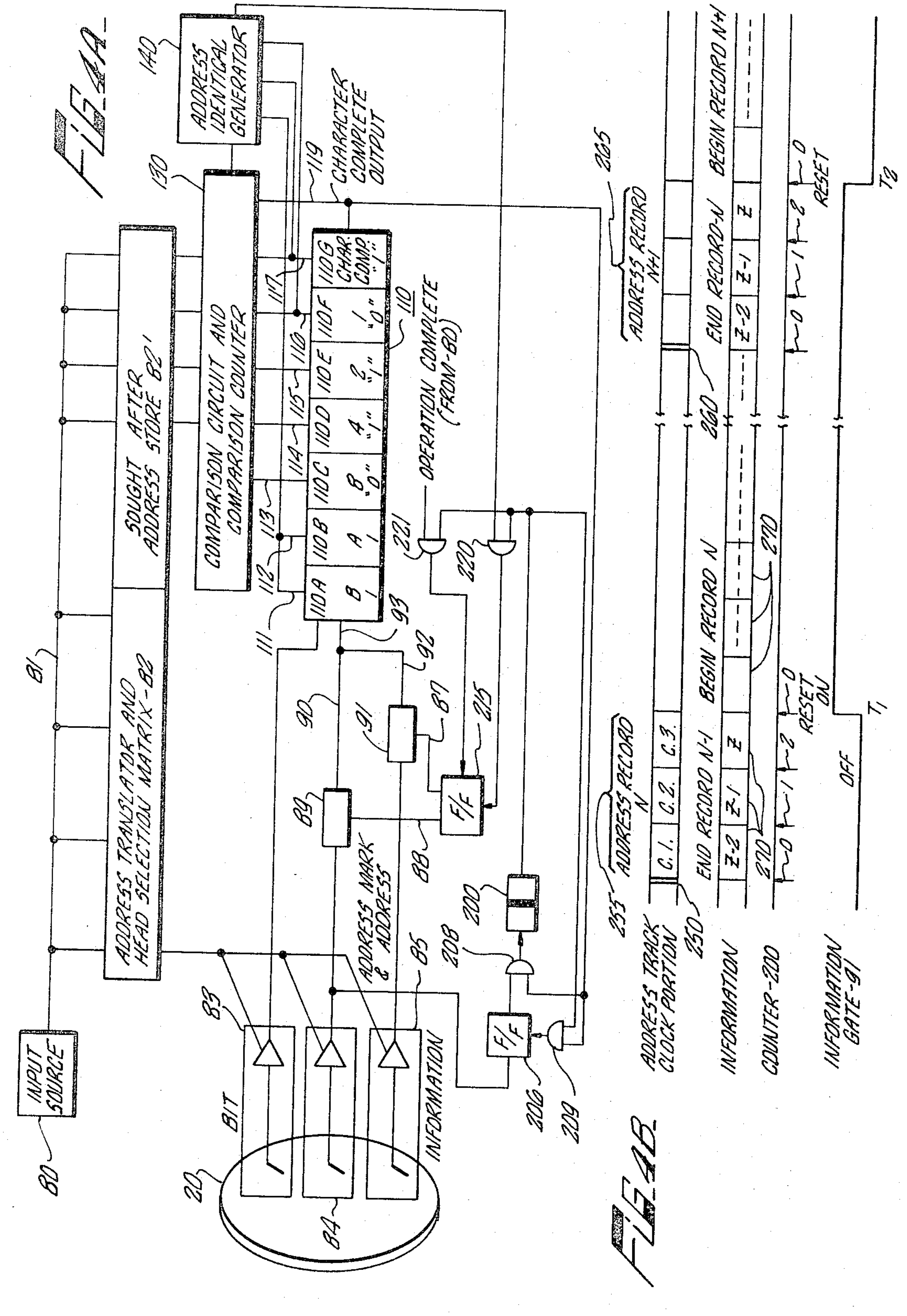
FIG. 4A is a block diagram of an alternate address and information retrieval circuit embodying the principles of this invention.
FIG. 4B is a pulse chart useful in promoting a full understanding of the method and apparatus of FIG. 4A.

In a noninterlaced format, a predetermined number of words successively follow each other in a record as depicted in FIG. 4B wherein information is represented as three records namely, $N-1$, and $N+1$. Each one of these records consists of successive words, each word having several characters 270, and each character being made up of several binary bits. In this regard it has been discussed that a binary bit format of six bits per character is typical, although eight bit characters and other well-known bit combinations for characters and words are equally within the scope of this invention.

In order to address a record of successive words such as record N, an address mark 250 immediately precedes the absolute address 255 for record N which address 255 may, for purposes of example, include three characters C1, C2 and C3. Each character of the absolute address has the same bit count as each of the characters in the words of the records stored in the information portion of the disk. This equality in bit counts for address characters and information characters may be appreciated by reference to FIG. 4B wherein a character C3 of the absolute address 255 for record N is shown in time synchronism with the last character Z at the end of record $N-1$; and characters C1 and C2 of the absolute address correspond in a similar manner to characters Z–1 and Z–2 of record $N-1$. The last bit of the final characters C3 of an absolute address is thus in time synchronism with the last bit of the last character Z of the record $N-1$ immediately preceding the record N identified by the absolute address 255. This time synchronism with the end of the address and the end of the record immediately preceding the one identified by the address, provides a technique which allows easy addressing with a minimum of equipment and further allows the circuitry of FIG. 4A to automatically end information reading in a new and novel manner.

Briefly, this new and novel information recovery system includes the technique of employing a second address mark, such as 260, which is recorded in the address track of the clock portion before the end of the record being transferred relative to the memory disk. This second address mark 260 sets a counting circuit which thereafter monitors the characters of the record being translated relative to the memory disk and emits a signal at the end of the record. In the example shown by FIG. 4B, three characters Z–2, Z–1 and Z of record N are counted, and thereafter the information transferring operation ceases and the system returns to an address searching mode.

The format for a successive word record as briefly discussed in conjunction with FIG. 4B is readily addressed by the information storage and retrieval circuitry of FIG. 4A. In FIG. 4A a considerable amount of the circuitry of FIG. 4 is repeated and similar numbers designate similar components in the figures. As was true in conjunction with the description of FIG. 4, a control input source 80 applies to lead 81 a train of binary signals which selects three different heads 83 through 85 and places a sought after address in the address store 82'. Head 84 monitors the address track in the clock portion and thus when address mark 250 appears under the head 84 this mark 250 is applied to flip-flop 206 so as to change the state of flip-flop 206 in such a manner that a true condition is thereafter continually applied to one input of AND gate 208. Flip-flop 206 will hold this true condition until reset by a pulse applied through AND gate 209 in a manner to be described following the description of a complete recovery of an address. AND gate 208 requires two input terms the other input term being supplied by a character complete output signal on lead 119 from the character complete stage 110G of shift register 110. As was true in the previous operation in conjunction with FIG. 4, the address track gate 89 is normally maintained in an ON, or low impedance, condition by the normal output state of flip-flop 215. Thus, the address mark 250, in addition to setting flip-flop 206 with a true condition for AND gate 208, is gated to shift register 110 by gate 89 wherein it serves as an insert one and clear bit. Thereafter, in the manner previously described, the first character C1 of address 255 for record N is shifted, under control of bit signals recovered from the bit monitoring head 83, into the stages 110A through 110F of shift register 110. Assuming that an address character is again written in the format shown within the stages of shift register 110, an address comparing operation takes place when the first character of the address has been stored in shift register 110 as designated by the character complete pulse appearing in stage 110G of shift register 110. A character complete output signal appears on lead 119 for each complete character stored in shift register 110 whether that character is a character of information from the information portion or is the character of an address from the clock portion. The character complete output on lead 110 is applied back to the stage of 110B of shift register 110 in the manner described hereinbefore and no further description of the feedback operation is believed necessary. At the same time a character complete output signal on lead 119 is applied to an AND gate 208 which is connected between a flip-flop circuit 206 and a two stage counter 200. The flip-flop circuit 206 is normally set in a state which presents a true condition to one input of AND gate 208 and thus the character complete output pulse on lead 119 establishes coincidence at gate 208 and an output signal is delivered to a counter 200. Counter 200 may be any two stage counter of the type well known in the art which counts three pulses and then resets to zero.

The first character complete output signal on lead 119 is applied to AND gate 208 and inasmuch as both inputs for that gate are true, a pulse is gated through to counter 200. This first character complete pulse is registered as a count of one in counter 200 which count is held until the second character C2 of address 255 has been transmitted through address gate 89 into shift register 110 and a second character complete output signal appears on lead 119. Flip-flop 206 maintains its true condition at AND gate 208 and thus this second character complete output pulse is gated through to counter 200 where it is counted as a second count. In a similar manner the third character C3 of the address is transmitted by address gate 89 into shift register 110 and the third and final character complete output signal appears on lead 119 where it is counted by counter 200. At the third count in counter 200 an output signal is immediately fed back to AND gate 209 during the appearance time of the third character complete output pulse on lead 119. Thus flip-flop 206 is reset and counter 200 is reset through AND gate 208 to a zero state which counter 200 will hold until flip-flop 206 is again set in a true condition for AND gate 208 by the next address mark 260.

Assuming that address 255 matches the sought after address the comparison circuit and comparison counter 130 activates the address identified generator 140 when the third and final character of the address appeared in the shift register 110. The output of address identical generator 140 is thus coincidentally applied with the output signal emitted by counter 200 to an AND gate 220. The true conditions provided by the output of counter 200 and address identified generator 140 pulses flip-flop 215 so as to alter its output conditions on leads 87 and 88. Thus, flip-flop 215 sets the address gate 89 in an OFF, or high impedance condition, and gate 91 is set in an ON, or low impedance, condition. Recalling again by reference to address 255 of FIG. 4B that the character complete pulse of character C3 of the address appears at the same time that the last bit of the last character of record $N-1$ appears, it is apparent that the information read-write head 85 will recover the first bit of record N at time $t_1$ in FIG. 4B wherein information gate 91 is shown assuming an ON condition. Flip-flop 212 set in the manner just described maintains gate 91 in an ON or low impedance condition throughout the entire record N.

Prior art bit counting techniques are not employed in FIG. 4A in order to determine when the end of record N appears. Rather, the circuit of FIG. 4A provides a unique technique of signaling the end of an information record reading process by utilizing the address mark 260. Address mark 260 sets flip-flop 206 into a true condition for AND gate 208. This address mark 260 is one bit period before the three address characters of address 265, and is also one bit period before the last three characters Z–2, Z–1 and Z of the addressed record N. Inasmuch as the address gate 89 is OFF address 265, identifying record $N+1$, is not shifted to shift register 110 which continues to receive the information represented by the last three characters of record N. Thus, as character Z–2 fills the shift register 110, a character complete output pulse appears on lead 119 and this output pulse together with the true condition of flip-flop 206 satisfies AND gate 208 and counter 200 registers a count of one. This same counting operation takes place for the next two characters Z–1 and Z of record N. Thus, at the end of the last character Z of record N, the third count causes counter 200 to emit an output signal and it also resets counter 200 in the manner just described. Since no new address has been presented to comparison circuit 130, address identical generator 140 is still satisfied and a true condition is presented to AND gate 220. This true condition at gate 220, together with the emitted pulse from counter 200, pulses flip-flop 215 at time $t_2$, FIG. 4B. Since flip-flop 215 is already set in an information reading condition in which gate 91 is held ON, the additional pulse from AND gate 220 does not alter the state of flip-flop 215, and continued reading of information may take place.

On the other hand, if it is desired to stop reading with the end of record N control unit 80 applies an "operation complete" signal to AND gate 221. This AND gate 221 has its output lead connected to the reset terminal of flip-flop 215. At coincidence with the output emitted at time $t_2$ by counter 200, AND gate 221 resets flip-flop 215. Flip-flop 215 thus places the address gate 89 in a low impedance condition and information gate 91 in a high impedance condition so that the circuit of FIG. 4A stop reading precisely at the end of record N and returns to an address searching mode.

It is to be understood that the above described arrangements are illustrative of the principles of this invention. Numerous other arrangements may be devised by those skilled in the art without departing from the spirit and scope of this invention.

What is claimed is:

1. The method of recording data on a storage means comprising the steps of assigning to an information portion of said storage means sectors in which words of more than one record are to be interlaced, recording in one track of a clock portion of said storage means signals which mark the location of all of the words in said sectors, and further recording in the same track with the word mark signals an absolute address signal which follows the word mark signal immediately preceding the word mark signal of the first word of the record identified by said address signal.

2. The method of recording data on a memory store comprising the steps of assigning to an information portion of said memory store sectors in which words of more than one record are to be interlaced in a numerical sequence, recording in a clock portion of said memory store a continuous train of bit signals which mark the locations where such information bits of each of the words of all records are to be stored in said information portion, reading back from said clock portion said information locating bit signals and counting a predetermined number of said bits which define a complete word in said information portion, recording in another track of said clock portion of said memory store one word mark signal for each predetermined count, and recording in the same track with the word mark signals an absolute address signal which follows the word mark signal immediately preceding the word mark signal of the first word of the record identified by said address signal.

3. The method of recording data on a memory store comprising the steps of assigning to an information portion of said memory store sectors in which words of more than one record are to be interlaced in a numerical sequence, recording in a clock portion of said memory store a continuous train of bit signals which mark the locations where each information bit of each of the words of all records are to be stored in said information portion, synchronously recording in another track of said clock portion one word mark signal for each group of a predetermined number of said bit signals, and recording in the same track with the word mark signals an absolute address signal synchronized with said bit signals and following the word mark signal which immediately precedes the word mark signal of the first word of the record identified by said address signal.

4. The method of claim 3 wherein said word mark and absolute address signals are recorded on said memory store in a recording step concurrently with the bit signal recording step.

5. The method of recording data on a magnetic memory store comprising the steps of assigning to an information portion of said memory store sectors in which words of more than one record are to be interlaced in a numerical sequence, passing said memory store under a write head positioned at one track of a clock portion of said memory store, writing in said clock track a continuous train of bit signals which mark the locations where each information bit of each of the words of all records are to be stored in said information portion, passing said clock track of said memory store under a read head, reading back from said clock track said information locating bit signals and counting a predetermined number of said bit signals to define a complete word in said information portion, passing said memory store under a write head positioned at another track of said clock portion, writing in said other track of said clock portion one word mark signal for each of said predetermined counts, and writing in the same track with said word mark signals an absolute address signal which follows the word mark signal immediately preceding the word mark signal of the first word of the record identified by said address signal.

6. The method of recording data on a magnetic memory store comprising the steps of assigning to an information portion of said memory store sectors in which words of more than one record are to be interlaced in a numerical sequence, passing said memory store under a write head positioned at one track of a clock portion of said memory store, writing in said clock track a continuous train of bit signals which mark the locations where each information bit of each of the words of all records are to be stored in said information portion, passing said clock track of said memory store under a read head, reading back from said clock track said information locating bit signals and counting a predetermined number of said bit signals to define a complete word in said information portion, passing said memory store under a write head positioned at another track of said clock portion, writing in said other track of said clock portion in synchronism with said bit signals one word mark signal for each of said predetermined counts, and writing in the same track with said word mark signals a group of address signals synchronized with said bit signals and following the word mark signal which immediately precedes the word mark signal of the first word of a record that is identified by this group of address signals.

7. The method of recording data on a memory store comprising the steps of assigning to an information portion of said memory store sectors in which words of more than one record are to be interlaced in a numerical sequence, recording in a clock portion of said memory store a continuous train of bit signals which mark the locations where each information bit of each of the words of all records are to be stored in said information portion, counting a predetermined number of said bit signals which define a complete word in said information portion, and simultaneously with said bit signal recording step, recording in another track of said clock portion of said memory store one word mark signal for each predetermined count, and further recording in the same track with the word mark signals an absolute address signal which follows the word mark signal immediately preceding the word mark signal of the first word of the record identified by said address signal.

8. The method of recording data on a magnetic memory store comprising the steps of assigning to an information portion of said memory store sectors to which bit groups of more than one record are to be interlaced in a numerical sequence, passing said memory store under a first write head positioned at one clock track of a clock portion of said memory store, writing in said clock track a continuous train of bit signals which mark the locations where each information bit of all bit groups of all records are to be stored in said information portion, counting a predetermined number of said bit signals so as to define complete bit groups from each record in said information portion, passing said memory store under a second write head positioned at another track of said clock portion, writing in said other track of said clock portion one bit group marking signal for each of said predetermined counts, and writing in the same track with said bit group marking signals, an address signal immediately preceding the bit group marking signal of the first bit group of the record identified by said address signal.

9. In an information address recording system in which predetermined groups of information signals from more than one record are interlaced in an information portion of a memory store, the combination comprising writing means positioned at one track of a clock portion of said memory, activating means connected to said writing means for writing in said one track a marking signal for a group of said predetermined signals, said marking signal preceding the first group of one record, storage means having registered therein a number identifying said one record, gating means for connecting said storage means to said writing means, and means for enabling said gating means only after activation of said writing means for said marking signal.

10. An information address recording combination as defined in claim 9 wherein said activating means comprises a signal counter preset to emit an activating pulse as a marking signal to be written by said writing means after counting a predetermined number of signals.

11. An information address recording combination as defined in claim 10 and further comprising reading means for recovering the location of each of said information signals from said memory store, and means connected between said reading means and said signal counter for activating said counter once for each one of said recovered signals.

12. In an information address recording system in which an information track of a memory is divided into sectors in which words, each having a predetermined number of bits, from more than one record are interlaced, the combination comprising means for recording in a clock track of said memory a continuous train of bit signals marking the location of each bit of each of the words of all the records in said information track, means for reading back said bit signals from said clock track, writing means position at another clock track of said memory store, counting means connected to said reading means and preset to generate word mark and control signals which precede the first word of a record to be identified, means connected between said counting means and said writing means and responsive to said emitted word mark signal for activating said writing means so as to write on said memory a word mark signal which precedes the first word of a record to be identified, an address circuit having registered therein a number representing said record to be identified, gating means for connecting said address circuit to said writing means, and means connected between said counting means and said address circuit gating means and responsive to said control signals following the appearance of said written word mark signal for enabling said gating means.

13. An information address recording system in accordance with claim 12 wherein said address circuit comprises a shift register having a shift lead connected to said reading means, an output circuit connected to said gating means, and a shift control lead connected to said gate enabling means.

14. An information address recording system in accordance with claim 13 wherein said gate enabling means comprises a coincident logic gate connected between said counting means and said shift control means, and further comprises means for generating a logic gate activating signal coincident with said control signals.

15. An information address recording system in accordance with claim 14 wherein said activating signal generating means comprises a bistable multivibrator circuit.

16. An information address retrieval circuit for a memory having predetermined groups of information signals from more than one record numerically interlaced in an information portion, and address signals preceding a marking signal for the first predetermined group of information signals of a desired record written in a clock portion, said retrieval circuit comprising means for storing the address of said desired record, means for recovering signals from said information and clock portions, address signal comparison means, means connected between said signal recovery means and said address comparison means for normally gating said recovered address signals to said comparison means, pulse generating means connected between said comparison means and said gating means for delivering a priming pulse to said gating means only when said addresses compare identical, and means connected between said signal recovery means and said gating means for altering the normal condition of said gating means upon recovery of said marking signal for said first predetermined group of information signals of said desired record.

17. An information address retrieval circuit in accordance with claim 16 wherein said signal recovery means comprises first and second reading heads for said clock and said information tracks, and wherein said gating means comprises first and second gating devices connected respectively to said first and second reading heads, and control means connected to said gating devices and set in a condition for normally holding said first gating device in a low impedance condition and said second gating device in a high impedance condition.

18. An address retrieval circuit in combination with a memory store having recorded thereon an information portion in which a plurality of information tracks are divided into sectors having two groups of a predetermined number of words making up two records interlaced, and a clock portion having signals marking the location of each word of all the records and further having record identifying signals which follow the word mark signals immediately preceding the word mark of the first word of the record identified thereby, said address retrieval circuit comprising means for recovering signals stored in said clock portion, storage means, gating means connected between said storage means and said recovery means and set in a first impedance condition for storing said word mark and said record identifying signals in said storage means, means associated with said storage means for comparing said recovered record identifying signals with a sought after record address and emitting a signal indicating an address identical comparison, pulse generating means connected to said comparison means and said gating means and responsive to said address identical signal for priming said gating control means, and word mark repeating means connected between said reading means and said gating means for changing the impedance condition of said gating control means upon occurrence of the word mark which follows said record identifying signals.

19. In an information address recording and retrieval system for a memory having stored thereon predetermined groups of information signals from more than one record interlaced in an information portion thereof, the combination comprising; means for individually recording in one track of a clock portion of said memory, a first word mark signal for a group of information signals which precede a first group of one record, a second word mark signal for said first group of signals of said one record, and address signals intermediate said first and second word marks for identifying said one record; and means for retrieving said record identifying signals comprising first means for storing said address sought to be retrieved, second storage means, signal recovery means associated with said memory and connected to said second storage means, said recovery means being set in an operative condition for causing said record identifying signals to be stored in said second storage means, means connected between said first and second storage means for comparing said stored signals, said signal comparison means being responsive to identical signals in said first and second storage means for generating an address identical signal, and means connected between said signal comparison means and said signal recovery means and responsive to said address identical signal and said second word mark signal, for altering the operative condition of said signal recovery means.

20. An information address recording and retrieval combination in accordance with claim 19 wherein said clock signal recording means comprises writing means positioned at said one clock track of said memory, activating means connected to said writing means for writing said first and second word marks, storage means having registered therein a number identifying said one record, gating means for connecting said storage means to said writing means, and means for enabling said gating means only after activation of said writing means for writing said first word signal.

21. An information address recording and retrieval combination in accordance with claim 19 wherein said signal recovery means comprises first and second reading heads for said clock and said information tracks, first and second gating means connected respectively between said first and second reading heads and said second storage means, and gating control means connected to said gating means and set in a condition for normally holding said first gating means in a low impedance condition and said second gating means in a high impedance condition.

22. An information address recording and retrieval combination in accordance with claim 21 wherein said gating control means comprises a bistable multivibrator.

23. An address recovery circuit in combination with a storage medium having recorded thereon an information track containing two distinct records N and $n$ plus X, where X is any other record, in which the words making up each record are interlaced in a numerical order such that the first word of record N plus X follows the first word of record N, and the last word of record N plus X follows the last word of record N, and further having recorded thereon an address track assigned to and distinct from said information track and containing word mark signals marking the beginning of each word in said records and further containing record identifying signals following the word mark preceding the first word mark of the next upcoming record, said address recovery circuit comprising first means for storing signals representative of the identity of a sought after record, first reading means for recovering signals from said information track, second reading means for recovering signals from said address tracks, second signal storage means, first and second gating means each having input, output and control terminals, means connecting said output terminals in common and to said second storage means, means connecting said input terminals of said first and second gates respectively to said first and second reading means, a two-state gating control means having its normally ON side connected to said control terminal of said first gate, and its normally OFF side connected to the control terminal of said second gate, for causing upcoming record address identifying signals to be stored in said second storage means, means connected between said first and second storage means for comparing the address identifying signals stored therein, and address identical pulse generating means connected between said comparison means and said two-state control means for delivering a priming signal thereto when said sought after and recovered address signals are identical, and word mark repeating means connected between said signal recovery means and said gating control means and operative upon occurrence of the next following word mark signal for changing the state of said control means.

24. In an information address recording system in which predetermined groups of information signals constituting at least one record are assigned storage positions in an information portion of a memory store, the combination comprising, writing means positioned at one track of a clock portion of said memory, activating means connected to said writing means for writing in said one track a marking signal for a group of said predetermined signals, which marking signal precedes the first group of information signals of one record, storage means having registered therein a number identifying said one record, gating means for connecting said storage means to said writing means, and means enabling said gating means only after activation of said writing means for writing said identifying number after said marking signal and before the first group of information signals for the record identified thereby.

25. In an information address recording system in which an information track of a memory is divided into sectors in which words, each having a predetermined number of bits, from more than one record are interlaced, the combination comprising means for recording in a clock track of said memory a continuous train of bit signals marking the location of each bit of each of the words of all the records in said information track, writing means positioned at another clock track of said memory store, counting means associated with said bit signal recording means and preset to emit word marking signals which mark the beginning of each word in the information track, means connected between said counting means and said writing means and responsive to said emitted word marking signals for activating said writing means so as to write on said memory a word marking signal which precedes the first word of a record to be identified, an address circuit having registered therein a number representing said record to be identified, gating means for connecting said address circuit to said writing means, and control means connected to said address circuit gating means for enabling said gating means to write a record identifying number between said word mark signal and the first word of the record identified by said record identifying number.

26. A storage means comprising a formatted magnetic memory surface, said magnetic memory surface having an information portion and a clock portion separate from said information portion, said information portion having at least one information track for receiving a predetermined number of successively appearing signals which constitute one record of information, a marking signal recorded in the clock portion which marking signal precedes the first information signal of said one record, and an absolute address signal identifying said one record recorded in said clock portion between said marking signal and the first information signal of the record identified by said absolute address signal.

27. A memory store for a computer system comprising a magnetic memory surface having an information portion and a clock portion separate from said information portion, each of said portions having concentric signal storage tracks, an information track in said information portion for receiving a predetermined number of successive signals which together constitute one information record, a clock track in said clock portion having recorded therein a marking signal which precedes the first information signal of said one record, and an absolute address signal for identifying said one record recorded in said clock portion between said marking signal and the first information signal of said one record.

28. A memory store for a disk file computer comprising at least one magnetic memory disk having concentric tracks for information signal storage, concentric clock tracks in a clock portion separate from said information storage tracks, one of said clock tracks having recorded therein a marking signal which precedes a first group of information signals which information signals together constitute one record of said information portion, and an absolute address signal identifying said one record recorded in said clock portion between said marking signal and the first information signal of the record identified by said address signal.

29. A disk file computer system comprising, at least one magnetic memory disk having concentric tracks for information signal storage, concentric tracks in a clock portion separate from said information storage tracks, one of said tracks in said clock portion having recorded therein marking signals each of which precedes a first information signal position for each record of several records stored in said information portion, and an absolute address signal for identifying each record, each address signal being recorded in said clock portion between one of said marking signals and the first information signal position of the record identified by said address signal; means for storing the address of a desired record in which information is to be written or read; means for recovering marking and address signals from said clock portion of said memory disk; address signal comparison means; means connected to said marking and address signal recovery means and to said address comparison means for presenting address signals recovered thereby to said comparison means for comparison with said desired address; a read-write circuit at said information portion normally maintained in a disabled condition and capable of being enabled by an electrical enabling level applied thereto; and means connected between said read-write circuit and said address signal comparison means for emitting an enabling level to said read-write circuit when an address recovered by said signal recovery means matches said address stored in said desired address storage means.

30. A disk file computer system in accordance with claim 29 wherein said read-write circuit comprises a transducer head positioned at one track of the information portion of said memory disk and adapted for transferring information signals relative to said memory disk, a first gating device normally set in an information signal blocking condition connected to said trasducer head, said first gating device being capable of assuming an information signal transmitting condition in response to an enabling level applied to a control lead thereof; and wherein said means connected between said read-write circuit and said address signal comparison means comprises a bistable device, set normally in a first state, and connected to the control lead of said first gating device, said bistable device being responsive to an address match for assuming second state presenting an enabling level to the control lead of said first gating device.

31. A disk file computer system in accordance with claim 30 wherein said records of information in said information portion of said memory disk are in the form of words each made up of groups of binary bit signals, and wherein words from at least one record other than said desired record are interlaced with one another in one information track and wherein said marking signals in said clock track each mark the beginning of each of said interlaced words; and means connected between said bistable device and said marking and address signal recovery means for repetitively altering the state of the bistable device for the word mark signal marking the first word of the nondesired record which follows the first word of the desired record and every word mark signal thereafter including the word mark signal marking the last word of said desired record.

32. A disk file computer system in accordance with claim 31 wherein said address presenting means, connected to said marking and address signal recovery means and to said signal comparison means, comprises a second gating device normally set in a signal passing condition for said marking and address signals and capable of assuming a signal blocking condition in response to a disabling level applied to a control lead thereof; and further comprising means connecting said control lead of said second gating device to said bistable device for disabling said second gating device whenever said first gating device is enabled by said bistable device.

33. A disk file computer system in accordance with claim 32 and further comprising in said address signal comparison means a storage register connected to said second gating device for receiving address signals subsequent to the address signal of the desired record as such address signals are gated through said second gating device; and means associated with said storage register and responsive to the storage of an address therein which does not match the desired address for placing said bistable device in its first state presenting a continued enabling level to said second gating device and a continued disabling level to said first gating device until an address matching the desired address is stored in the storage register.

34. A disk file computer system in accordance with claim 33 wherein each address signal comprises a predetermined number of bit groups with each bit group having a unique code as compared to said information signals, and wherein said enabling level emitting means further comprises a counter for counting said predetermined number of uniquely coded bit groups and for emitting an output signal when said predetermined number of address bit groups have been counted, and a logic device connected to said address comparison means and to said counter and responsive to an output from said counter and from an address match in said comparison means for emitting said enabling level to said bistable device only when an address identical to said desired address has been stored in said storage register.

35. A disk file computer system in accordance with claim 29 wherein said records of inforamtion in said information portion of said memory disk are in the form of words each made up of groups of binary bit signals, with successive words of one record following each other, and with one record following another record in one information track, and wherein said marking signals are followed by a multibit address signal having the end bit thereof in synchronism with the end of the record immediately preceding the record identified by said address signal.

36. A disk file computer system in accordance with claim 35 wherein said means connected between said read-write circuit and said address signal comparison means comprises means sensing the end bit of said address signal for emitting said enabling level to said read-write circuit when said end bit is sensed.

37. A disk file computer system in accordance with claim 35 wherein all multibits forming said address are in synchronism with an equal number of binary bits which form the end portion of said record immediately preceding the record identified by said address; and wherein said sensing means comprises a counter operative in response to synchronism between said address bit signals and said information bit signals following said address marking signal for delivering said enabling signal when the end bit of said address is sensed.

38. A disk file computer system in accordance with claim 37 wherein said read-write circuit comprises a transducer head positioned at one track of the information portion of said memory disk and adapted for transferring information signals relative to said memory disk, a first gating device normally set in an information signal blocking condition connected to said transducer head, said first gating device being capable of assuming an information signal transmitting condition in response to an enabling level applied to a control lead thereof; and wherein said means connected between said read-write circuit and said address signal comparison means comprises a bistable device connected to the control lead of said first gating device and responsive to an address match therein for assuming one state presenting an enabling level to the control lead of said first gating device.

39. A disk file computer system in accordance with claim 38 wherein said address presenting means, connected to said marking and address signal recovery means and to said signal comparison means, comprises a second gating device normally set in a signal passing condition for said marking and address signals and capable of assuming a signal blocking condition in response to a disabling level applied to a control lead thereof; and further comprising means connecting said control lead of said second gating device to said bistable device for disabling said second gating device whenever said first gating device is enabled by said bistable device.

40. A disk file computer in accordance with claim 38 and further comprising means for sensing the marking signal associated with the next upcoming record and emitting a first output signal in response thereto; and means for counting the binary bits subsequent to said sensed marking signal and forming the end of the desired record for emitting a second output signal at the end of said desired record; and a logic device responsive to said first and second output signal for placing said bistable device in its state for presenting a continued enabling level to said second gating device and a continued disabling level to said first gating device until an address signal matching a desired address signal is presented to said address comparison means.

References Cited

UNITED STATES PATENTS

| | | | |
|---|---|---|---|
| 3,293,608 | 12/1966 | Klein et al. | 340—174.1 |
| 3,065,461 | 11/1962 | Aronis | 340—174.1 |
| 2,932,010 | 4/1960 | Mayer et al. | 340—174.1 |
| 2,923,922 | 2/1960 | Blickensderfer | 340—174.1 |

BERNARD KONICK, *Primary Examiner.*

A. I. NEUSTADT, *Assistant Examiner.*

UNITED STATES PATENT OFFICE

CERTIFICATE OF CORRECTION

Patent No. 3,375,507 March 26, 1968

Ralph A. Gleim et al.

It is certified that error appears in the above identified patent and that said Letters Patent are hereby corrected as shown below:

Column 2, line 32, "INIVENTION" should read -- INVENTION --. Column 3, line 31, before "from" insert -- reduced --. Column 6, line 15, "Flip-flop 4" should read -- Flip-flop 34 --; line 57, "flip-op" should read -- flip-flop --; line 63, "the" should read -- this --. Column 16, line 36, "N-1," should read -- N-1, N --. Column 18, line 33, "212" should read -- 215 --. Column 26, line 17, "inforamtion" should read -- information --.

Signed and sealed this 9th day of September 1969.

(SEAL)

Attest:

Edward M. Fletcher, Jr.

Attesting Officer

WILLIAM E. SCHUYLER, JR.

Commissioner of Patents